(12) United States Patent
Takiya et al.

(10) Patent No.: US 11,307,877 B2
(45) Date of Patent: Apr. 19, 2022

(54) INFORMATION PROCESSING APPARATUS AND INFORMATION PROCESSING METHOD

(71) Applicant: SONY CORPORATION, Tokyo (JP)

(72) Inventors: Sho Takiya, Tokyo (JP); Toshimoto Mitomo, Tokyo (JP); Masashi Takeda, Tokyo (JP); Nobuhide Nishiyama, Tokyo (JP); Kumiko Koyama, Shizuoka (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/106,570

(22) Filed: Nov. 30, 2020

(65) Prior Publication Data
US 2021/0081224 A1    Mar. 18, 2021

Related U.S. Application Data

(62) Division of application No. 16/415,453, filed on May 17, 2019, now Pat. No. 10,877,781.

(60) Provisional application No. 62/703,145, filed on Jul. 25, 2018.

(51) Int. Cl.
| | | |
|---|---|---|
| *G06F 9/451* | (2018.01) | |
| *G06F 3/04812* | (2022.01) | |
| *G06F 3/16* | (2006.01) | |

(52) U.S. Cl.
CPC .......... *G06F 9/451* (2018.02); *G06F 3/04812* (2013.01); *G06F 3/165* (2013.01); *G06F 3/167* (2013.01)

(58) Field of Classification Search
CPC ............................. G06F 9/451; G06F 3/04812
USPC .......................................................... 715/765
See application file for complete search history.

(56) References Cited

U.S. PATENT DOCUMENTS

| | | |
|---|---|---|
| 9,691,130 B2 | 6/2017 | Plagemann et al. |
| 10,437,421 B2 | 10/2019 | Kang et al. |
| 2011/0055007 A1 | 3/2011 | Kitagawa et al. |
| 2012/0304092 A1 | 11/2012 | Jarrett et al. |
| 2013/0147793 A1 | 6/2013 | Jeon et al. |
| 2014/0359499 A1 | 12/2014 | Cho et al. |
| 2015/0193036 A1* | 7/2015 | Yoo ..................... G06F 3/04847 345/173 |
| 2015/0227249 A1* | 8/2015 | Kim ...................... G06F 1/1694 345/173 |
| 2015/0379687 A1 | 12/2015 | Plagemann et al. |
| 2016/0035312 A1* | 2/2016 | Lee ........................ G06F 9/451 717/174 |
| 2016/0085430 A1 | 3/2016 | Moran et al. |
| 2016/0134932 A1* | 5/2016 | Karp ....................... H04L 67/22 348/155 |

(Continued)

OTHER PUBLICATIONS

Non-Final Office Action for U.S. Appl. No. 16/415,453, dated Apr. 13, 2020, 16 pages.

(Continued)

*Primary Examiner* — William D Titcomb
(74) *Attorney, Agent, or Firm* — Chip Law Group

(57) ABSTRACT

Disclosed is an information processing apparatus that includes a controller that acquires one of sensing information or user context information including one of a user state, a user profile, or user environment information and generates step switching information for controlling switching of a plurality of reproduction steps of content based on one of the sensing information or the user context information.

8 Claims, 25 Drawing Sheets

(56) References Cited

U.S. PATENT DOCUMENTS

2017/0348854 A1* 12/2017 Oleynik .................. A47J 47/02
2018/0136947 A1    5/2018 Choi et al.
2018/0136979 A1*  5/2018 Morris .................. G06F 9/5055
2018/0158288 A1*  6/2018 Logan ..................... G01S 19/51
2018/0176662 A1*  6/2018 Brugler ............... H04L 12/2823
2018/0184152 A1*  6/2018 Kirkpatrick ...... H04N 21/43635
2018/0206083 A1*  7/2018 Kumar .................. H04W 4/025
2018/0284735 A1* 10/2018 Celia ........................ G06N 3/02

OTHER PUBLICATIONS

Notice of Allowance for U.S. Appl. No. 16/415,453, dated Aug. 28, 2020, 06 pages.

* cited by examiner

Reproduction screen

List 1-1 (for voice)

List 2-1 (for touch)

List 1-2 (for voice)

List 2-2 (for touch)

Reproduction screen + list (for touch)

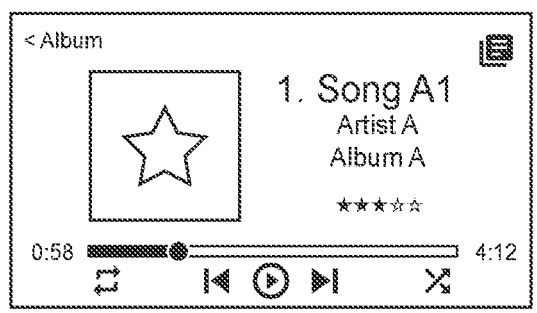
FIG. 7A
FIG. 7B
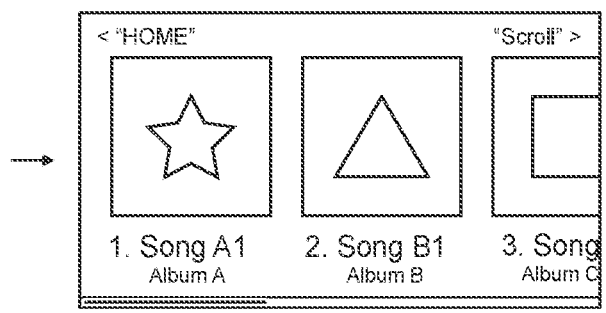
FIG. 7C

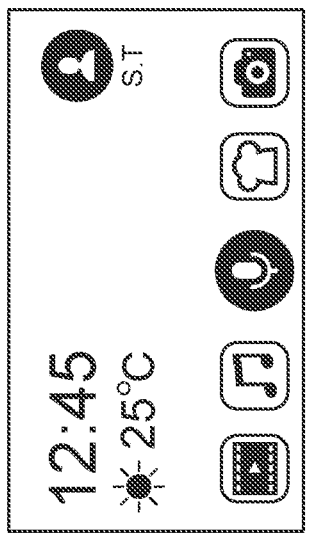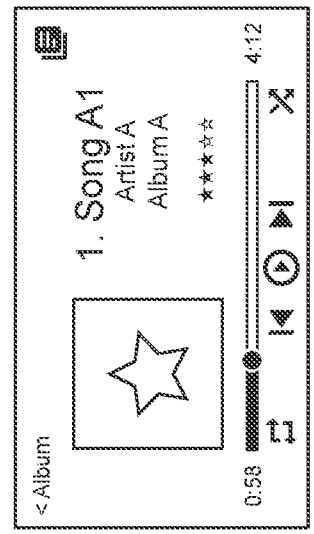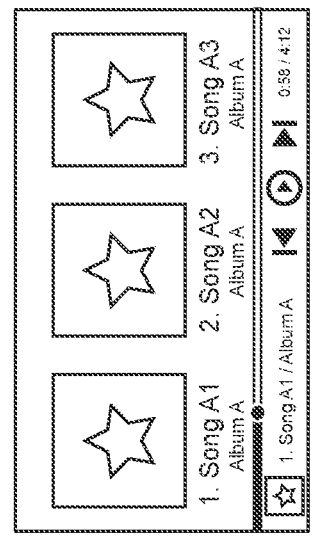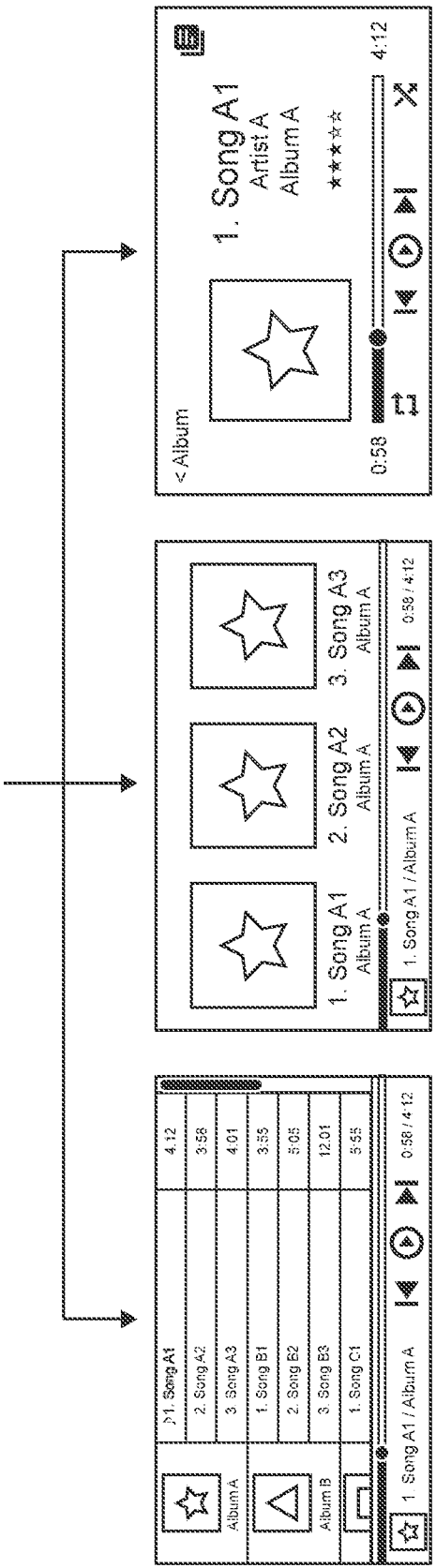
FIG. 10A
FIG. 10B
FIG. 10C
FIG. 10D

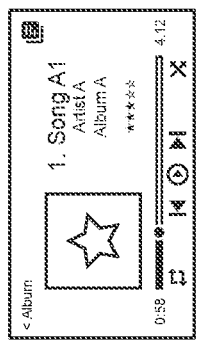
FIG. 15A
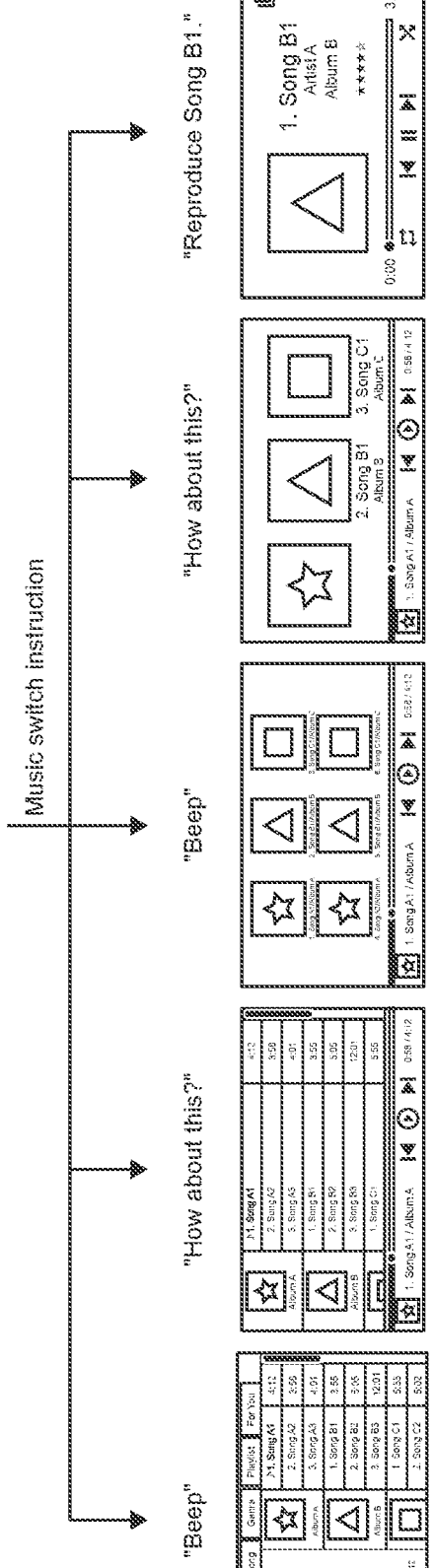
"Beep"
FIG. 15B
"How about this?"
FIG. 15C
"Beep"
FIG. 15D
"How about this?"
FIG. 15E
"Reproduce Song B1."
FIG. 15F

| Step | Moving picture time | Content | Operations | Materials | Quantities | Appliances |
|---|---|---|---|---|---|---|
| 1 | 00:00 | "Beat egg" | "Beat", "stir" | "Egg" | "2" | "Bowl", "whisk" |
| 2 | 03:11 | "Cut onion fine" | "Cut", "fine cut" | "Onion" | "1/2" | "Knife", "chopping board" |
| 3 | 06:11 | "Fry onion" | "Fry", "roast" | "Onion" | "1/2" | "Stove", "pan", "turner" |
| 4 | ... | ... | ... | ... | ... | ... |
| 5 | ... | ... | ... | ... | ... | ... |

FIG. 26

Reproduce moving picture of step 1

Pause when step 1 ends.

FIG. 27B

Reproduce moving picture of step 2

INFORMATION PROCESSING APPARATUS AND INFORMATION PROCESSING METHOD

CROSS-REFERENCE TO RELATED APPLICATION

The present application is a Divisional application of U.S. patent application Ser. No. 16/415,453, filed May 17, 2019, which application claims the benefit of priority of Provisional Application Ser. No. 62/703,145, filed Jul. 25, 2018, the entire content of which is incorporated herein by reference.

BACKGROUND

The present technology relates to an information processing apparatus, an information processing method, and a program capable of controlling the switching of a user interface operated by a user or the reproduction of content viewed by the user according to the context of the user.

Japanese Patent Application Laid-open No. 2010-191487 discloses the presentation of content according to the distance between a user and a device or the distance between users.

SUMMARY

The technology disclosed in Japanese Patent Application Laid-open No. 2010-191487 allows the change of presented content itself according to the context of a user but does not allow the switching of the reproduced matter of content or a user interface for operating the content.

In view of the above circumstances, it is desirable to provide an information processing apparatus, an information processing method, and a program capable of presenting an optimum user interface for a user or controlling the reproduced matter of content according to the context of the user.

To this end, an information processing apparatus according to an embodiment of the present technology includes a controller configured to determine a user interface presented to a user among a plurality of user interfaces on the basis of user context information containing one of a user state, a user profile, and user environment information.

According to the configuration, the information processing apparatus is allowed to present an optimum user interface for a user according to the context of the user. Here, the user state is, for example, the position, the distance from the information processing apparatus, the action, the visual line, the face direction, the posture, the expression, the pose, the living body information, or the like of the user. The user profile is full name information, account information, attribute information, physical information, preference information, action history information, human relationship information, or the like. Further, the user environment information includes not only information acquired from a camera, a microphone, and other sensing equipment provided in the information processing apparatus such as a noise level, temperature, humidity, illumination, brightness, time at a place at which the information processing apparatus is placed but also sensing information acquired from other equipment.

Here, the user interface is an information presentation unit for urging the user to perform an input through a prescribed input unit. The input unit may include, for example, a voice input, a touch input, a button input, a gesture input, a visual-line input, a remote input, or the like. Further, the information presentation unit may include a screen output, a voice output, or the like.

The plurality of user interfaces may include a voice input user interface, a touch input user interface, a gesture input UI, a button input UI, a visual-line input UI, a remote input UI, or the like. Here, for example, the voice input UI is an information presentation unit for urging the user to perform a voice input, and includes, for example, information presentation through a screen output, information presentation through a voice output, or the like.

The controller may determine the touch input user interface as the presented user interface when determining that the distance between the user and the information processing apparatus is within a prescribed distance, and may determine any of the voice input user interface, the gesture input UI, the visual-line input UI, and the remote input UI as the presented user interface when determining that the distance is larger than the prescribed distance.

Thus, the information processing apparatus is allowed to improve the convenience of the user by presenting the touch input UI when the user is at a distance at which the user is allowed to visually recognize or touch screen content and presenting any of the voice input UI, the gesture input UI, the visual-line input UI, and the remote input UI when the user is at a distance at which the user has a difficulty in visually recognizing or touching the screen content.

The controller may cause one of the touch input user interface and the voice input user interface to have a first information amount when determining that a visual line of the user is directed to the information processing apparatus. Further, the controller may cause one of the touch input user interface and the voice input user interface to have a second information amount smaller than the first information amount when determining that the visual line of the user is not directed to the information processing apparatus.

Thus, the information processing apparatus is allowed to present a detailed UI when the user sees the information processing apparatus and present a simple UI when the user does not see the information processing apparatus. In this manner, the information processing apparatus may present an optimum UI for the user according to the visual line of the user. Here, the information amount includes the number of pieces of content, the number of menus, the number of buttons, the amount of meta information, or the like.

When determining that a plurality of users exist within a prescribed region including the information processing apparatus, the controller may determine the presented user interface on the basis of a user determined to exist at a position closest to or farthest from the information processing apparatus among the plurality of users.

When determining that a plurality of users exist within a prescribed region including the information processing apparatus, the controller may determine the presented user interface on the basis of a user determined to have eyes thereof turned to the information processing apparatus among the plurality of users.

Thus, even when a plurality of users exist, the information processing apparatus is allowed to present a UI suited to any of the users.

The controller may change the prescribed distance used to determine the presented user interface according to a level of sound detected around the information processing apparatus.

Thus, the information processing apparatus is allowed to prevent an input error in the voice input user interface by changing a threshold for switching the presented user interface according to whether a surrounding voice input environment is good or bad.

When the user is detected to lie down, the controller may determine the voice input user interface as the presented user interface.

Thus, for example, when the user lies down on a bed, the information processing apparatus presents the voice input UI. Thus, the user eliminates the inconvenience of getting up to perform a touch operation.

Further, when recognizing that both hands of the user are full through image recognition or the like, the controller may determine the voice input user interface as the presented user interface. Here, a state in which both hands of the user are full includes a state in which the user holds a baggage with his/her hands or a state in which both hands get wet with water or the like.

Thus, the information processing apparatus is allowed to avoid the occurrence of inconvenience in which the touch input UI is presented to the user although the hands of the user are full and the user is not capable of performing an operation in that state.

An information processing apparatus according to another embodiment of the present technology includes a controller configured to generate step switching information for controlling switching of a plurality of reproduction steps of content on the basis of one of user context information containing one of a user state, a user profile, and user environment information and sensing information collected from other devices.

According to the configuration, the information processing apparatus is allowed to control the reproduced matter of content according to one of the context of a user and sensing information from other equipment. Other equipment is, for example, a cooking appliance (such as a stove, a microwave oven, and a blender), a refrigerator, a camera, or the like, and the sensing information is, for example, a heating time of the stove or the microwave oven, information on foodstuffs in a refrigerator, or the like.

The content may include moving picture content in which the reproduction steps and reproduction time are associated with each other. In this case, the controller may be configured to control reproduction of the moving picture content on the basis of the step switching information and the reproduction time.

Thus, the information processing apparatus is allowed to control the pause, the reproduction, the rewind, the fast forward, or the like of moving picture content according to the context of the user.

When recognizing a prescribed word from voice input through a voice input or when recognizing a prescribed gesture from an image input through an imager, the controller may be configured to generate the step switching information.

Thus, the information processing apparatus is allowed to accurately recognize instructions from the user to switch content. Here, the prescribed word includes, for example, "Please teach next," "Next," "Go," "OK," or the like. The prescribed gesture includes, for example, a swipe operation, a hand sign (such as thumbs-up), blinking, or the like.

The content may include recipe content in which a cooking recipe is described for each of cooking processes corresponding to the reproduction steps. In this case, the controller may be configured to recognize an action of a user on the basis of the sensing information, and generate the step switching information when determining that a cooking process corresponding to a current reproduction step is completed.

Thus, the information processing apparatus is allowed to determine the complete of a cooking process from the action of the user and reproduce the reproduction step of a next cooking process without receiving explicit instructions from the user. The action of the user includes, for example, the operation of moving a knife up and down in a process in which the user cuts a foodstuff, the operation of turning chopsticks or a spatula in a process in which the user mixes foodstuffs together in a bowl.

Further, the controller may be configured to recognize a state of a foodstuff contained in the cooking recipe on the basis of the sensing information, and generate the step switching information when determining that a cooking process corresponding to a current reproduction step is completed.

Thus, the information processing apparatus is allowed to determine the complete of a cooking process from the state of a foodstuff recognizable by sensing information and reproduce the reproduction of a next cooking process without receiving explicit instructions from the user. Here, the sensing information includes, for example, information indicating that fine cut is completed after a sensor embedded in a knife detects a fine-cut state (such as prescribed acceleration and prescribed angular speed) in a fine-cut process, information indicating that a sensor embedded in a stove recognizes the weight of a pan and detects heating for a prescribed time in a heating process for the prescribed time.

Further, the controller may be configured to analyze each of the cooking processes of the recipe content, and transmit an instruction signal for providing instructions on an output of prescribed annotation information to one of a cooking appliance of the user and a device near the cooking appliance associated with each of the cooking processes when each of the cooking processes is performed.

Thus, the information processing apparatus is allowed to cause the user to easily understand a cooking appliance to be used in each of the cooking processes. The prescribed annotation information includes, for example, the output of light or sound.

Further, the controller may be configured to analyze each of the cooking processes of the recipe content, and transmit an instruction signal for providing instructions on implementation of at least a part of at least one of the cooking processes to a cooking appliance of the user used in the at least one of cooking processes.

Thus, the information processing apparatus is allowed to perform cooking instead of the user in at least a part of the processes.

An information processing method according to another embodiment of the present technology includes: acquiring user context information containing one of a user state, a user profile, and user environment information; and determining a user interface presented to a user among a plurality of user interfaces on the basis of the user context information.

An information processing method according to another embodiment of the present technology includes: acquiring one of user context information containing one of a user state, a user profile, and user environment information and sensing information collected from other devices; and generating step switching information for controlling switching of a plurality of reproduction steps of content on the basis of one of the user context information and the sensing information.

A program according to another embodiment of the present technology causes an information processing apparatus to perform: acquiring user context information containing one of a user state, a user profile, and user environment information; and determining a user interface presented to a user among a plurality of user interfaces on the basis of the user context information.

A program according to another embodiment of the present technology causes an information processing apparatus to perform: acquiring one of user context information containing one of a user state, a user profile, and user environment information and sensing information collected from other devices; and generating step switching information for controlling switching of a plurality of reproduction steps of content on the basis of one of the user context information and the sensing information.

As described above, according to an embodiment of the present technology, it is possible to present an optimum user interface for a user or control the reproduced matter of content according to the context of the user. However, the effect does not intend to limit the present technology.

These and other objects, features and advantages of the present disclosure will become more apparent in light of the following detailed description of best mode embodiments thereof, as illustrated in the accompanying drawings.

BRIEF DESCRIPTION OF DRAWINGS

FIGS. 7A, 7B, and 7C are diagrams showing a transition example of the user interfaces by the information processing terminal;

FIGS. 10A, 10B, 10C, and 10D are diagrams showing examples of the user interfaces displayed in respective final steps in FIG. 8;

FIGS. 15A, 15B, 15C, 15D, 15E, and 15F are diagrams showing examples of the user interfaces displayed in respective final steps in FIG. 13;

FIG. 26 is a diagram showing an example of recipe data using pieces of moving picture content in the recipe reproduction system;

FIGS. 27A, 27B, and 27C are diagrams showing an example of processing for switching reproduction steps using the pieces of moving picture content in the recipe reproduction system;

DETAILED DESCRIPTION OF EMBODIMENTS

Hereinafter, embodiments of the present technology will be described with reference to the drawings.

First Embodiment

First, a first embodiment of the present technology will be described.

(Outline of System)

Figure 1:
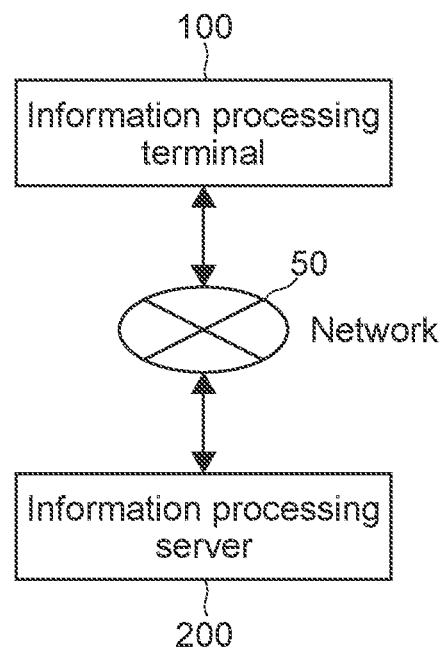
FIG. 1 is a diagram showing the configuration of a music reproduction system according to a first embodiment of the present technology.

FIG. 1 is a diagram showing the configuration of a music reproduction system according to the first embodiment of the present technology.

As shown in FIG. 1, the present system has an information processing terminal 100 and an information processing server 200, and the information processing terminal 100 and the information processing server 200 are capable of communicating with each other via a network 50 such as the Internet.

The information processing terminal 100 is, for example, a smart speaker (voice assistant device) equipped with a touch panel display. A user is capable of operating various applications installed in the information processing terminal 100 through both a voice input and a touch input.

Voice input to the information processing terminal 100 is transmitted to the information processing server 200 on a cloud. The information processing server 200 converts the voice into text to perform processing corresponding to the text and transmits voice corresponding to a result of the processing to the information processing terminal 100. The information processing terminal 100 reproduces the voice.

Further, processing requested to be performed by the information processing terminal 100 through a touch input is basically not performed by the information processing server 200 but is performed by the information processing terminal 100.

In the present embodiment, the information processing terminal 100 switches between a voice input user interface (hereinafter called UI) and a touch input UI according to a user context and presents one of the voice input UI and the touch input UI to the user.

The user context includes a user state, a user profile, or user environment information. The user state is, for example, the position, the distance from the information processing terminal 100, the action, the visual line, the face direction, the posture, the expression, the pose, the living body information, or the like of the user. The user profile is full name information, account information, attribute information, physical information, preference information, action history information, human relationship information, or the like. Further, the user environment information includes not only information acquired from a camera, a microphone, and other sensing equipment provided in the information processing apparatus such as a noise level, temperature, humidity, illumination, brightness, and time at a place at which the information processing terminal is placed but also sensing information acquired from other equipment.

(Hardware Configuration of Information Processing Terminal)

Next, the hardware configuration of the information processing terminal 100 will be described.

Figure 2:
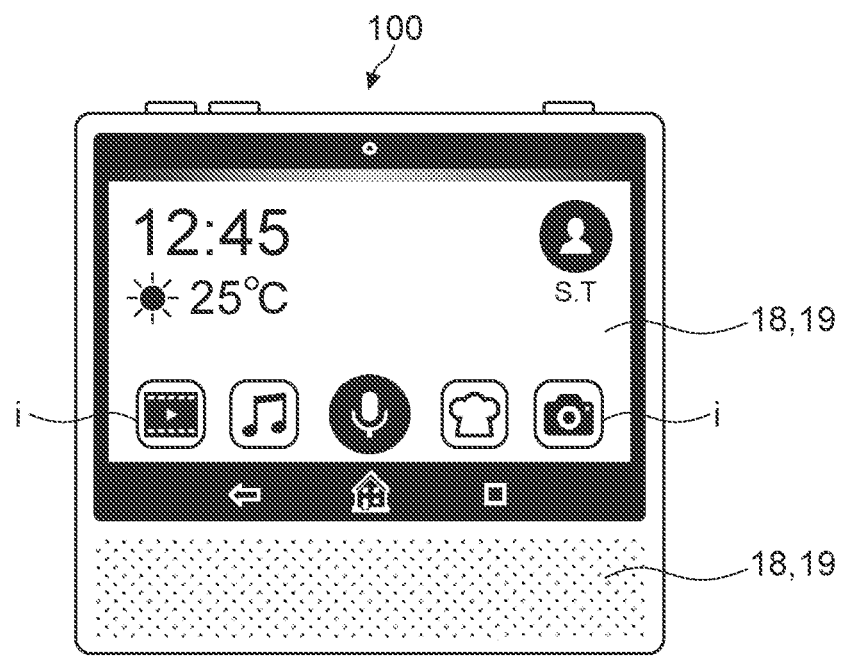
FIG. 2 is a diagram showing the appearance of the information processing terminal of the music reproduction system.
Figure 3:
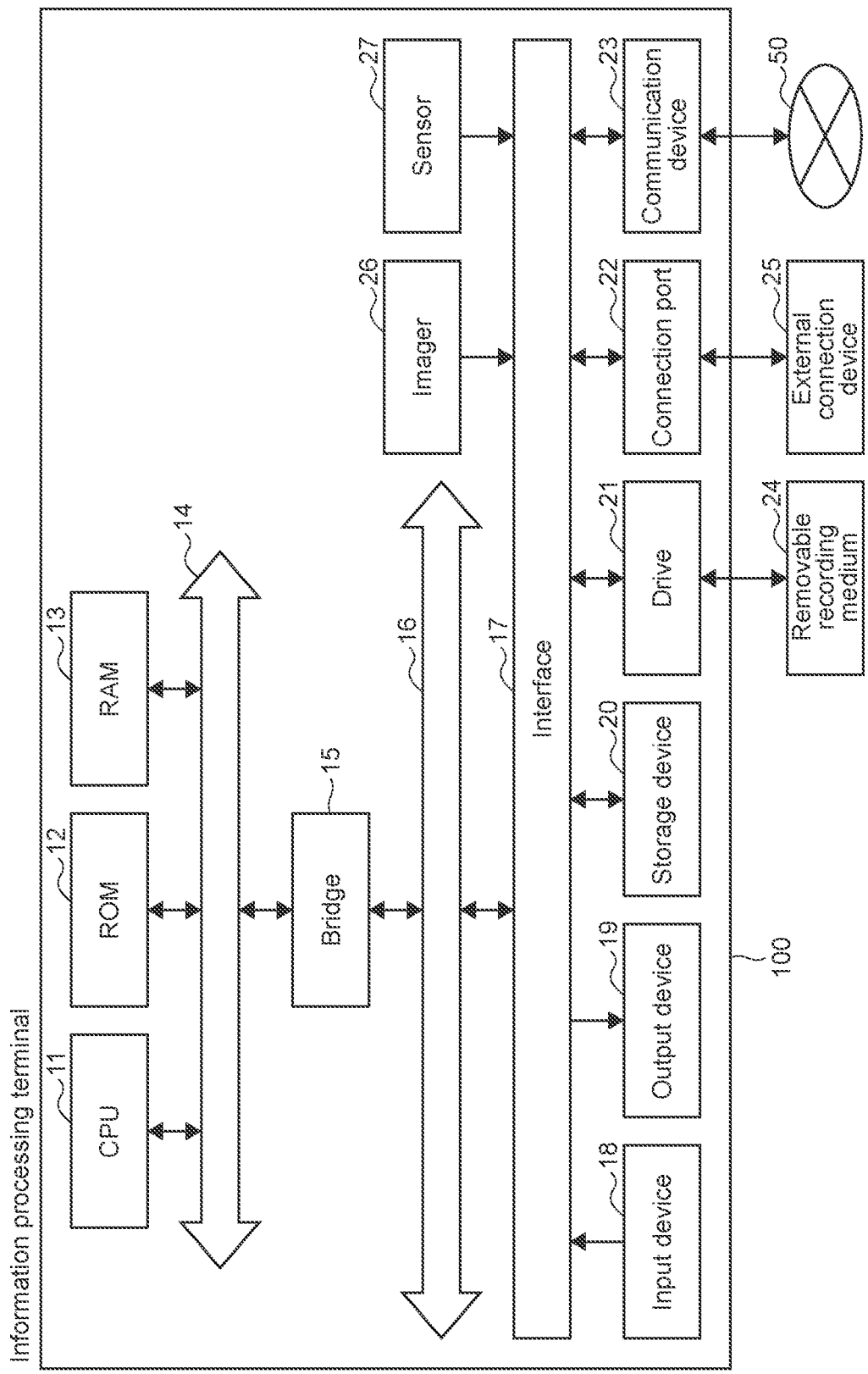
FIG. 3 is a diagram showing the hardware configuration of the information processing terminal.

FIG. 2 is a diagram showing the appearance of the information processing terminal 100. FIG. 3 is a block diagram showing a hardware configuration example of the information processing terminal 100.

As shown in FIG. 2, the information processing terminal 100 has, for example, a desktop housing rectangle in a front view and placeable on a table, a shelf, a floor, or the like.

Further, as shown in FIG. 3, the information processing terminal 100 includes a CPU (Central Processing Unit) 11, a ROM (Read Only Memory) 12, and a RAM (Random Access Memory) 13. Further, the information processing terminal 100 may include a host bus 14, a bridge 15, an external bus 16, an interface 17, an input device 18, an output device 19, a storage device 20, a drive 21, a connection port 22, and a communication device 23. In addition, the information processing terminal 100 may include an imager 26 and a sensor 27 where necessary. The information processing terminal 100 may have a processing circuit such as a DSP (Digital Signal Processor), an ASIC (Application Specific Integrated Circuit), and a FPGA (Field-Programmable Gate Array) instead of or together with the CPU 11.

The CPU 11 functions as a calculation processing unit and a control unit, and controls all or a part of operations inside the information processing terminal 100 according to various programs recorded on the ROM 12, the RAM 13, the storage device 20, or a removable recording medium 24. The ROM 12 stores a program, calculation parameters, or the like used by the CPU 11. The RAM 13 primarily stores a program used in the implementation of the CPU 11, parameters that appropriately change in the implementation, or the like. The CPU 11, the ROM 12, and the RAM 13 are connected to one another via the host bus 14 constituted by an internal bus such as a CPU bus. In addition, the host bus 14 is connected to the external bus 16 such as a PCI (Peripheral Component Interconnect/Interface) bus via the bridge 15.

The input device 18 is, for example, a unit such as a touch panel, a proximity sensor, a physical button, a switch, and a lever operated by the user. The input device 18 may be, for example, a remote unit that uses infrared rays or other electric waves or an external connection device 25 such as a smart phone and a smart watch that responds to the operation of the information processing terminal 100. The input device 18 includes an input control circuit that generates an input signal on the basis of information input by the user and outputs the generated input signal to the CPU 11. The user operates the input device 18 to input various data to the information processing terminal 100 or instruct the information processing apparatus 100 to perform a processing operation.

As shown in FIG. 2, a touch panel provided at a position ranging from a front central part to an upper part, a microphone provided at, for example, an upper surface, other physical buttons (such as a power button and a volume control button), or the like is provided as the input device 18 in the present embodiment.

The output device 19 is constituted by a unit capable of notifying the user of acquired information through feeling such as a sense of sight, a sense of hearing, and a sense of touch. The output device 19 may be, for example, a display unit such as a LCD (Liquid Crystal Display) and an organic EL (Electro-Luminescence) display, a voice output unit such as a speaker, or the like. The output device 19 outputs a result obtained by the processing of the information processing terminal 100 as video such as text and an image, voice such as sound and an echo, vibration, or the like.

As shown in FIG. 2, a display integrally provided with the touch panel, a speaker provided beneath the display, or the like is provided as the output device 19 in the present embodiment.

The screen of the display in FIG. 2 shows an example of a home screen. For example, besides time, weather information, and login user information, a plurality of icons i for activating respective applications such as a moving picture application, a music application, a cooking application, and a camera application are displayed on the screen.

The storage device 20 is a unit for data storage configured as an example of the storage device of the information processing terminal 100. The storage device 20 is constituted by, for example, a magnetic storage device such as a HDD (Hard Disk Drive), a semiconductor storage device, an optical storage device, a magnetic optical storage device, or the like. The storage device 20 stores, for example, a program or various data performed by the CPU 11, various data acquired from an outside, or the like.

The drive 21 is a reader/writer for a removable recording medium 24 such as a magnetic disk, an optical disk, a magnetic optical disk, and a semiconductor memory, and is internally or externally added to the information processing terminal 100. The drive 21 reads information recorded on the removable recording medium 24 attached thereto and outputs the read information to the RAM 13. Further, the driver 21 writes information into the removable recording medium 24 attached thereto.

The connection port 22 is a port for connecting a device to the information processing terminal 100. The connection port 22 may be, for example, a USB (Universal Serial Bus) port, an IEEE1394 port, a SCSI (Small Computer System Interface) port, or the like. Further, the connection port 22 may be a RS (Recommended Standard)-232-C port, an optical audio terminal, a HDMI™ (High-Definition Multimedia Interface) port, or the like. With the external connection device 25 connected to the connection port 22, various data may be exchanged between the information processing terminal 100 and the external connection device 25.

The communication device 23 is, for example, a communication interface constituted by a communication device or the like for connection with the communication network 50. The communication device 23 may be, for example, a LAN (Local Area Network), Bluetooth™, Wi-Fi, a communication card for a WUSB (Wireless USB), or the like. Further, the communication device 23 may be a router for optical communication, a router for an ADSL (Asymmetric Digital Subscriber Line), a modem for various communication, or the like. The communication device 23 transmits and receives, for example, a signal or the like to and from the Internet or other communication devices with a prescribed protocol such as TCP/IP. Further, the communication network 50 connected to the communication device 23 is a wired or wireless network and may include, for example, the Internet, a domestic LAN, infrared communication, radio wave communication, satellite communication, or the like.

The imager 26 is, for example, a camera that captures an image of real space with an imaging device such as a CMOS (Complementary Metal Oxide Semiconductor) and a CCD (Charge Coupled Device) and various members such as a lens for controlling the formation of an image of an object on the imaging device, and that generates a captured image. The imager 26 may capture an image of a still picture or a moving picture.

The sensor 27 includes, for example, various sensors such as an acceleration sensor, an angular speed sensor, a geomagnetic sensor, an illumination sensor, a temperature sensor, an air pressure sensor, and a sound sensor (microphone). The sensor 27 acquires, for example, information on the state of the information processing terminal 100 itself such as the posture of the housing of the information processing terminal 100 and information on the surrounding environment of the information processing terminal 100 such as the brightness and noise around the information processing terminal 100. Further, the sensor 27 may include a GPS (Global Positioning System) receiver that receives a GPS signal to measure the latitude, the longitude, and the altitude of the information processing terminal 100.

The respective constituents may be configured by general-purpose members or hardware tailored to the functions of the respective constituents. The configurations may be appropriately changed according to the levels of occasional technologies put into execution.

(Function Block Configuration of Information Processing Terminal)

Figure 4:
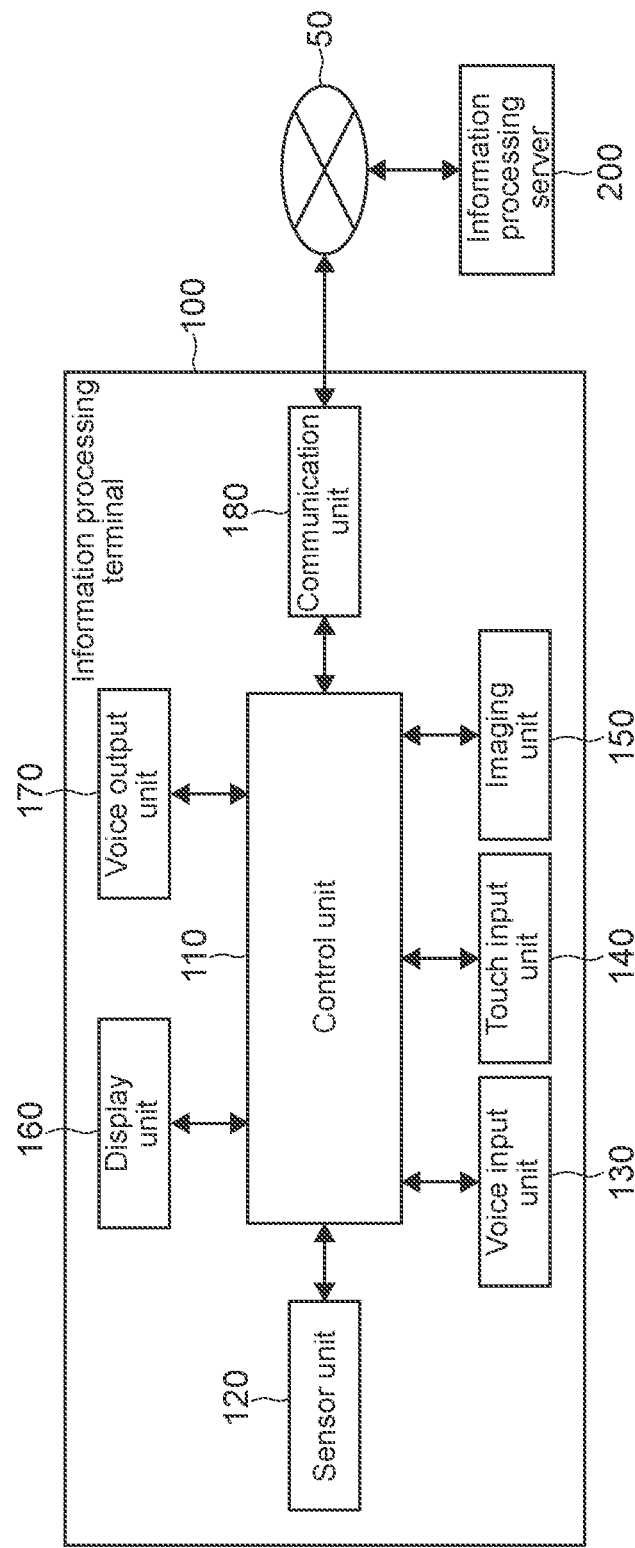
FIG. 4 is a diagram showing the function blocks of the information processing terminal.

FIG. 4 is a diagram showing the function blocks of the information processing terminal 100.

As shown in FIG. 4, the information processing terminal 100 has a control unit 110, a sensor unit 120, a voice input unit 130, a touch input unit 140, an imaging unit 150, a display unit 160, a voice output unit 170, and a communication unit 180 as the function blocks (software modules).

The control unit 110 generally controls the processing of the respective function blocks of the information processing terminal 100 in cooperation with the CPU 11.

The sensor unit 120 transfers sensing data detected by the sensor 27 to the control unit 110.

The voice input unit 130 transmits a voice signal converted from voice input to a microphone serving as the input device 18 to the control unit 110. The touch input unit 140 transmits information on a touch position sensed by a touch panel serving as the input device 18 to the control unit 110 as an information signal. The imaging unit 150 captures an image with the imager 26 on the basis of instructions from the control unit 110, or transmits the captured image to the control unit 110 as digital data.

The display unit 160 displays, on a touch panel serving as the output device 19, the GUI (Graphical User Interface; hereinafter also called UI) of activated various applications, besides the home screen.

As described above, the voice input UI and the touch input UI are displayed in a switching manner according to the context of the user by mainly a music application in the present embodiment.

The voice output unit 170 causes voice to be output from a speaker serving as the output device 19 on the basis of instructions from the control unit 110.

The communication unit 180 communicates with other apparatuses such as the information processing server 200 via the network 50 in cooperation with the communication device 23. For example, the communication unit 180 transmits voice data input from the user to the information processing server 200.

The respective functions may be provided in the information processing terminal 100, other external terminals, or devices on a cloud rather than being provided in the information processing server 200. In particular, the voice input unit 130, the imaging unit 150, and the display unit 160 may be provided in an external connection device.

(Function Block Configuration of Information Processing Server)

Figure 5:
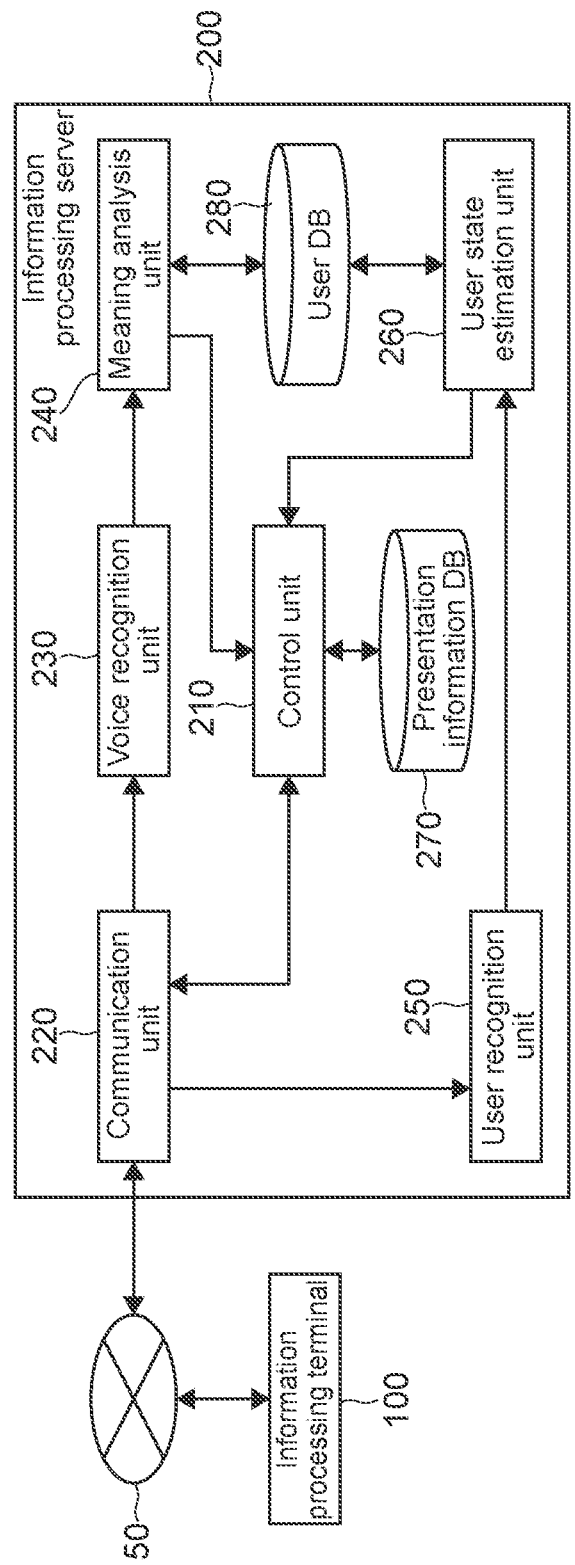
FIG. 5 is a diagram showing the function blocks of the information processing server of the music reproduction system.

FIG. 5 is a diagram showing the function blocks of the information processing server 200.

As shown in FIG. 5, the information processing server 200 has a control unit 210, a communication unit 220, a voice recognition unit 230, a meaning analysis unit 240, a user recognition unit 250, and a user state estimation unit 260 as the function blocks, and has the respective databases of a presentation information DB (database) 270 and a user DB 280.

The control unit 210 generally controls the processing of the respective function blocks of the information processing server 200 in cooperation with the CPU of the information processing server 200.

The communication unit 220 communicates with another device such as the information processing terminal 100 via the network 50. For example, the communication unit 220 receives voice data from the information processing terminal 100 and transmits the received voice data to the voice recognition unit 230 and the control unit 210. The communication unit 220 transmits data showing a processing result by the control unit 210 to the information processing terminal 100.

The voice recognition unit 230 processes voice data received from the information processing terminal 100 through voice recognition to be converted into text data and transmits the converted text data to the meaning analysis unit 240.

The meaning analysis unit 240 analyzes the meaning of text data by referring to the user DB 280 and transmits data showing the analyzed meaning to the control unit 210. The control unit 210 extracts presentation data corresponding to the data from the presentation information DB 270 and transmits the extracted presentation data to the information processing terminal 100 via the communication unit 220.

The user recognition unit 250 recognizes a person from captured image data received by the communication unit 220 and captured by the camera of the information processing terminal 100.

The user state estimation unit 260 estimates the state (or the action) of a recognized user by referring to the user DB 280 and transmits a result of the estimation to the control unit 210. The control unit 210 extracts presentation data corresponding to the result from the presentation information DB 270 and transmits the extracted presentation data to the information processing terminal 100 via the communication unit 220.

The respective functions may be provided in the information processing terminal 100, other external terminals, or devices on the cloud rather than being provided in the information processing server 200.

(Examples of User Interfaces of Information Processing Terminal)

Next, examples of UIs displayable on the display unit 160 when the information processing terminal 100 performs the music application among the respective applications will be described. FIGS. 6A, 6B, 6C, 6D, 6E, and 6F are diagrams showing examples of the various user interfaces. FIGS. 7A, 7B, and 7C are diagrams showing an example of the transition of the UIs.

Figure 6A:
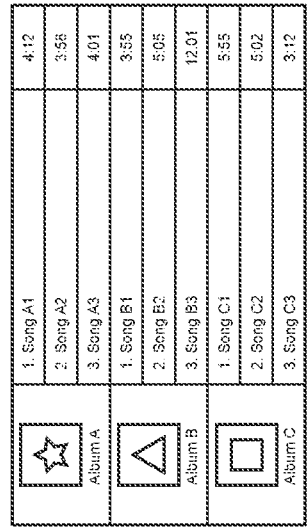
FIGS. 6A, 6B, 6C, 6D, 6E, and 6F are diagrams showing examples of various user interfaces displayable by the information processing terminal.

FIG. 6A shows a UI during the reproduction of specific music. For example, a control portion including a seek bar, a reproduction button, a fast forward button, a rewind button, or the like is arranged at the lower part of the UI, and the name of the music, the name of an artist, the name of a recorded album, an album jacket image, or the like is arranged at the upper part of the control portion.

Figure 6B:
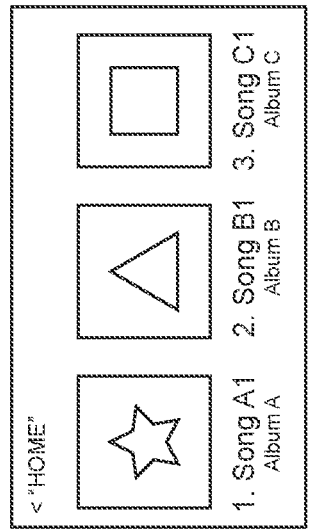
Figure 6C:
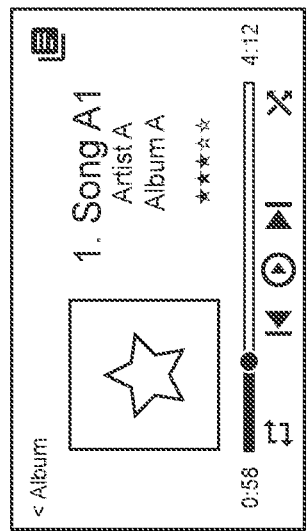
Figure 6D:
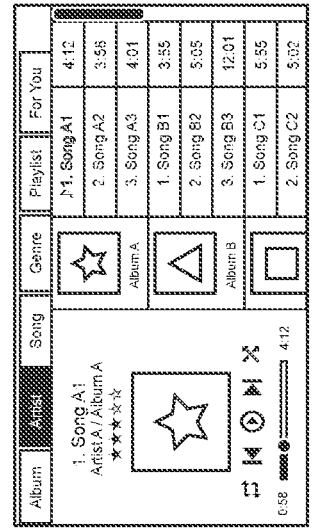
Figure 6E:
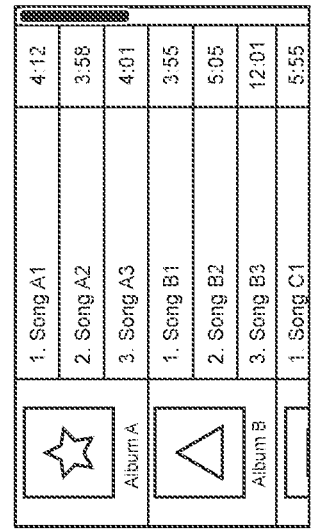

FIGS. 6B, 6C, 6D, and 6E show examples of music list screens on which the user selects music FIG. 6B shows a list screen for a voice input. In FIG. 6B, three pieces of information on respective albums mainly showing album jacket images are displayed side by side in a horizontal direction. FIG. 6C shows a list screen for a touch input. In FIG. 6C, compared with the list screen for the voice input in FIG. 6B, a list is arranged in a vertical direction, the respective album jacket images become smaller in size, and pieces of information on a plurality of music contained in the respective albums are also displayed in a list form. FIGS. 6D and 6E show versions in which the list screens in FIGS. 6B and 6C are made scrollable in the horizontal and vertical directions with scroll bars.

Figure 6F:
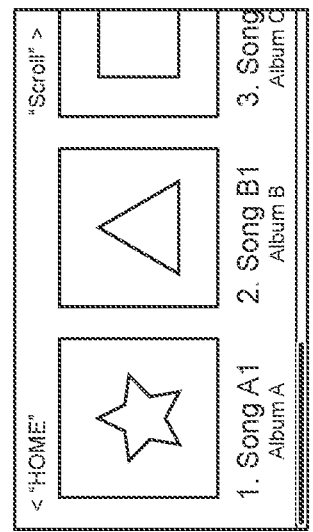

FIG. 6F shows a screen in which a reproduction screen in FIG. 6A and a list screen for a touch input in FIG. 6E are combined together.

As will be described in detail later, the voice input UI is assumed to be presented when the user is distant from the information processing terminal 100 and exists at a position at which the user is not allowed to perform a touch input (at which the user has a difficulty in seeing the UI). The UI is set to have a small amount of information (such as image objects, text, and list items) and a large grain size. Conversely, the touch input UI is assumed to be presented when the user is close to the information processing terminal 100 and exists at a position at which the user is allowed to perform a touch input (at which the user easily sees the UI). The UI is set to have a large amount of information and have a small grain size.

The information processing terminal 100 selects an appropriate one of the UIs according to the context (such as the position) of the user and displays the same. For example, when the reproduction screen transitions to the list screen, the information processing terminal 100 displays the detailed list screen for the touch input as shown in FIG. 7B if the user is in a state suitable for the touch input. When the user is not in the state suitable for the touch input, the relatively simple list screen for the voice input is displayed as shown in FIG. 7C.

(Operation of Music Reproduction System)

Next, the operation of the music reproduction system thus configured will be described. The operation is performed by the cooperation between hardware such as the CPU and the communication unit of the information processing terminal 100 or the information processing server 200 and software such as an application stored in a storage unit. Below, the CPU 11 of the information processing terminal 100 and the control unit 210 of the information processing server 200 will be mainly described as operation subjects for the sake of convenience.

Figure 8:
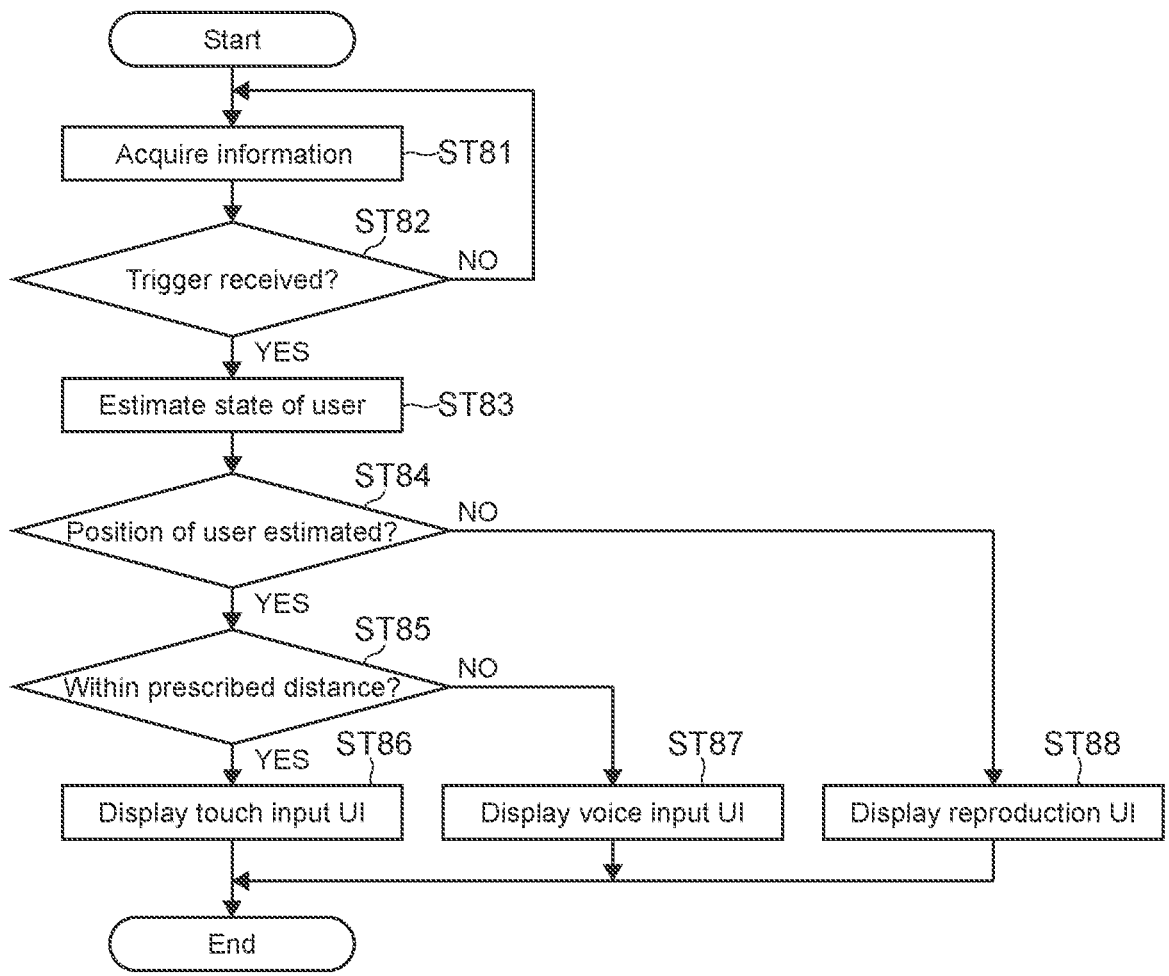
FIG. 8 is a flowchart showing the flow of processing for displaying the user interfaces in the music reproduction system.
Figure 9:
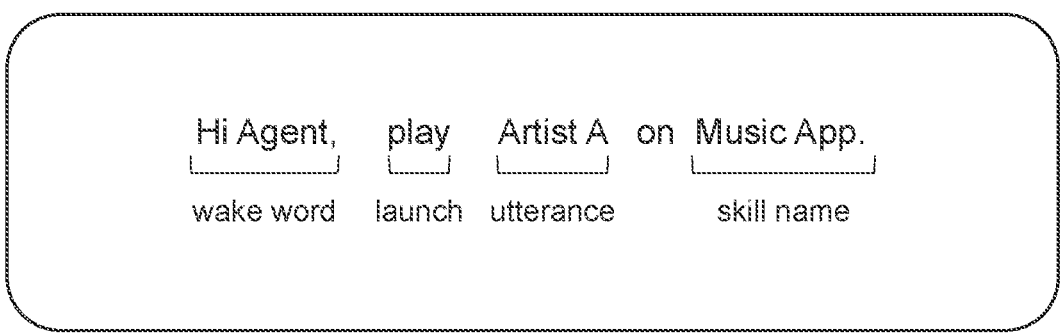
FIG. 9 is a diagram showing an example of music reproduction instructions input to the information processing terminal through voice.

FIG. 8 is a flowchart showing the flow of processing for display the UIs in response to a trigger by the information processing terminal 100.

As shown in FIG. 8, the CPU 11 of the information processing terminal 100 acquires information from the input device 18, the imager 26, the sensor 27, or the like at any time (step 81) and determines whether the trigger has been received from the information (step 82).

When the trigger includes, for example, music reproduction instructions, the input source of the music reproduction instructions may be a user's voice input, a touch input, or a remote operation. For example, it is assumed that the reproduction of the music of a specific artist by a music application is instructed through user's voice speech as shown in FIG. 8 in the display state of the home screen shown in FIG. 2 (Yes in step 82).

Note that the voice of the instructions has a prescribed wake word portion at the beginning, which is followed by a skill name (the name of a function such as an application) portion, an utterance portion, and a launch portion. The segmentation of the portions and the determination of the presence or absence of the reception of the trigger are performed by the voice recognition unit 230 and the meaning analysis unit 240 of the information processing server 200.

Then, the CPU 11 estimates the state of a user as an instruction source, specifically the position of the user (step 83). The estimation of the position of the user is performed by the user state estimation unit 260 of the information processing server 200 on the basis of a captured image captured by the imager 26.

The position of the user may be estimated on the basis of, for example, a difference in the arrival time of voice input from the user to a plurality of microphones or from GPS (Global Positioning System) information or VPS (Virtual Positioning System) information received from a terminal such as a smart phone possessed by the user. Further, the position of the user may be estimated by a positioning technology using beacon (BLE (Bluetooth Low Energy)) information or autonomous navigation (Dead Reckoning).

When the estimation of the position of the user is allowed (Yes in step 84), the control unit 210 of the information processing server 200 determines whether the position of the user is within a prescribed distance from the information processing terminal 100 on the basis of the captured image or the like (step 85). The prescribed distance is 0.5 m, 1 m, 2 m, or the like but is not limited to the distances.

When determining that the position of the user is within the prescribed distance, the control unit 210 transmits an instruction signal for providing instructions on the display of the touch input UI for causing the user to select the album of the artist contained in the reproduction instruction by touch on a touch panel to the information processing terminal 100. Upon receiving the instruction signal, the CPU 11 of the information processing terminal 100 controls the touch panel to display a touch input UI as shown in FIG. 10B (step 86).

When determining that the position of the user is beyond the prescribed distance, the control unit 210 transmits an instruction signal for providing instructions on the display of a voice input UI for causing the user to select the album by voice on the touch panel to the information processing terminal 100. Upon receiving the instruction signal, the CPU 11 of the information processing terminal 100 controls the touch panel to display a voice input UI as shown in FIG. 10C (step 87).

When determining that the estimation of the position of the user is not allowed in step S84 (No), the control unit 210 transmits an instruction signal for providing instructions on the display of a reproduction UI, in which the album of the artist contained in the reproduction instruction is, for example, picked up randomly or from the beginning in a list order and the music of the album is reproduced from the beginning or randomly, on the touch panel to the information processing terminal 100. Upon receiving the instruction signal, the CPU 11 of the information processing terminal 100 controls the touch panel to display a reproduction UI as shown in FIG. 10D (step 88).

Further, the control unit 210 may set a first distance and a second distance (the first distance<the second distance) as the prescribed distances. The control unit 210 may transmit an instruction signal to the information processing terminal 100 to display the touch input UI when the position of the user is within the first distance, display the voice input UI when the position of the user is beyond the second distance, or display another UI such as a gesture input UI, a visual-line input UI, and a remote input UI when the position of the user is between the first distance and the second distance.

(Display of UIs Based on Ranges in which User Exists)

Figure 11A:
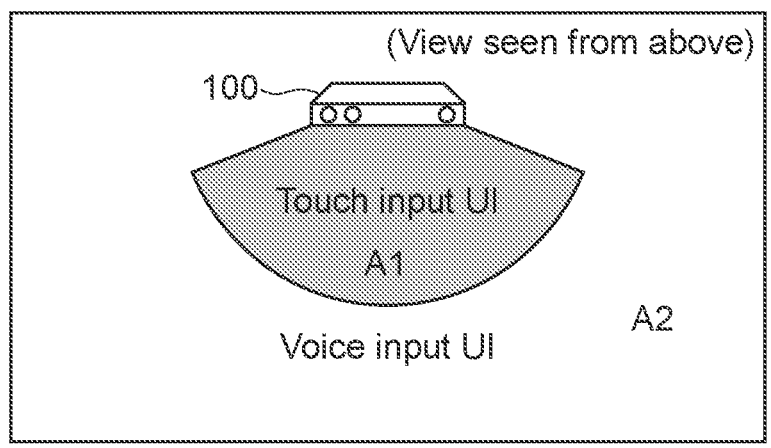
FIGS. 11A and 11B are diagrams for describing area ranges for switching the user interfaces in the music reproduction system.
Figure 11B:
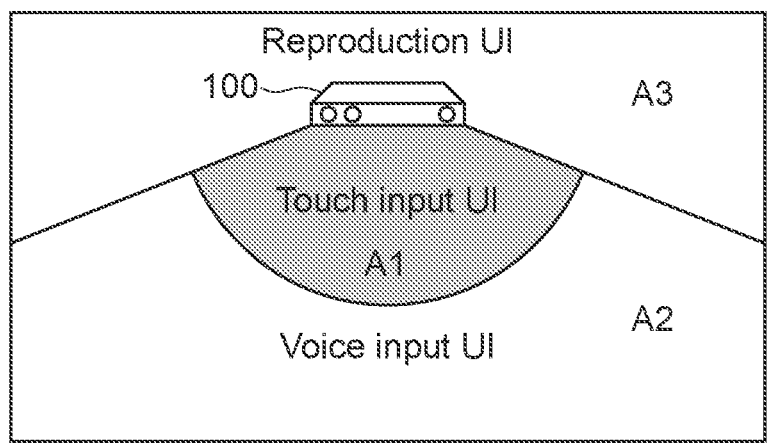

The CPU 11 may use prescribed area ranges instead of a prescribed distance as a determination criterion for determining the position of the user. FIGS. 11A and 11B are diagrams for describing the area ranges.

As shown in FIG. 11A, the CPU 11 may set, for example, an area range within the prescribed distance from the front surface of the information processing terminal 100 and within about 60 degrees from side to side as an area range A1 of the touch input UI and set the rest area range as an area range A2 of the voice input UI.

Further, as shown in FIG. 11B, the CPU 11 may set, for example, an area range within the prescribed distance from the front surface of the information processing terminal 100 and within 60 degrees from side to side as an area range A1 of the touch input UI, set an area range beyond the prescribed distance from the front surface and within 60 degrees from side to side as an area range A2 of the voice input UI, and set the rest area range (range in which the user is not allowed to see the UI) as an area range A3 of the simple reproduction UI. Further, the area range A3 may be set as an area range in which the screen (UI) is not displayed (only a speaker operates).

Figure 12:
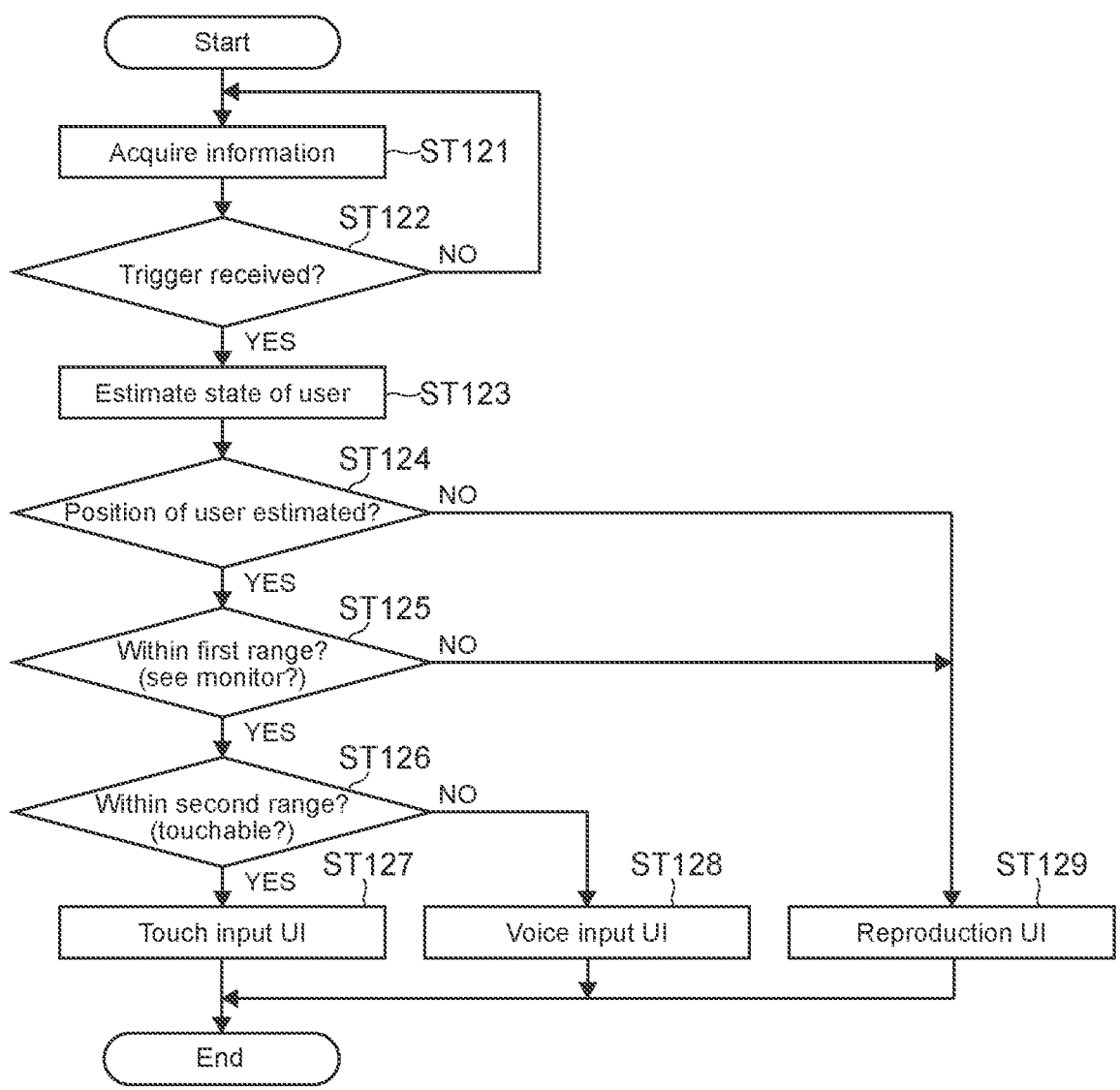
FIG. 12 is a flowchart showing the flow of processing for displaying the user interfaces according to the area ranges in the music reproduction system.

FIG. 12 is a flowchart showing the flow of processing for displaying the UIs according to the area ranges.

In FIG. 12, the processing of steps 121 to 124 is the same as that of steps 81 to 84 in FIG. 8.

When determining in step 124 that the estimation of the position of the user is allowed (Yes), the control unit 210 of the information processing server 200 determines whether the user exists in a first range (the area ranges A1 and A2) in which the user is allowed to see the display of the information processing terminal 100 (step 125).

When determining that the user exists in the first range (Yes), the control unit 210 determines whether the user exists in a second range (the area range A1 in FIG. 11B) in which the user is allowed to touch the display (step 126).

When determining that the user exists in the second range (Yes), the control unit 210 transmits the instruction signal for providing instructions on the display of the touch input UI for causing the user to select the album of the artist contained in the reproduction instruction through touch on the touch panel to the information processing terminal 100. Upon receiving the instruction signal, the CPU 11 of the information processing terminal 100 controls the touch panel to display the touch input UI as shown in FIG. 10B (step 127).

When determining that the user exists within the first range and beyond the second range (in the area range A2 in FIG. 11B), the control unit 210 transmits the instruction signal for providing instructions on the display of the voice input UI for causing the user to select the album through voice on the touch panel to the information processing terminal 100. Upon receiving the instruction signal, the CPU 11 of the information processing terminal 100 controls the touch panel to display the voice input UI as shown in FIG. 10C (step 128).

When determining in step S124 that the estimation of the position of the user is not allowed (No), the control unit 210 transmits the instruction signal for providing instructions on the display of the reproduction UI on the touch panel to the information processing terminal 100 like step 88 in FIG. 8. Upon receiving the instruction signal, the CPU 11 controls the touch panel to display the reproduction UI as shown in FIG. 10D (step 129).

The area ranges A1 and A2 may be further segmentized. For example, an area range A4 may be set between the area ranges A1 and A2. In this case, when determining that the user exists in the area range A4, the control unit 210 may transmit an instruction signal for providing instructions on the display of another UI such as a gesture input UI, a visual-line input UI, and a remote input UI on the touch panel to the information processing terminal 100.

(Display of UIs Considering Visual Line of User)

The CPU 11 may use the visual line of the user (determine whether the user sees the display of the information processing terminal 100), besides the area ranges as a determination criterion for determining the position of the user.

Figure 13:
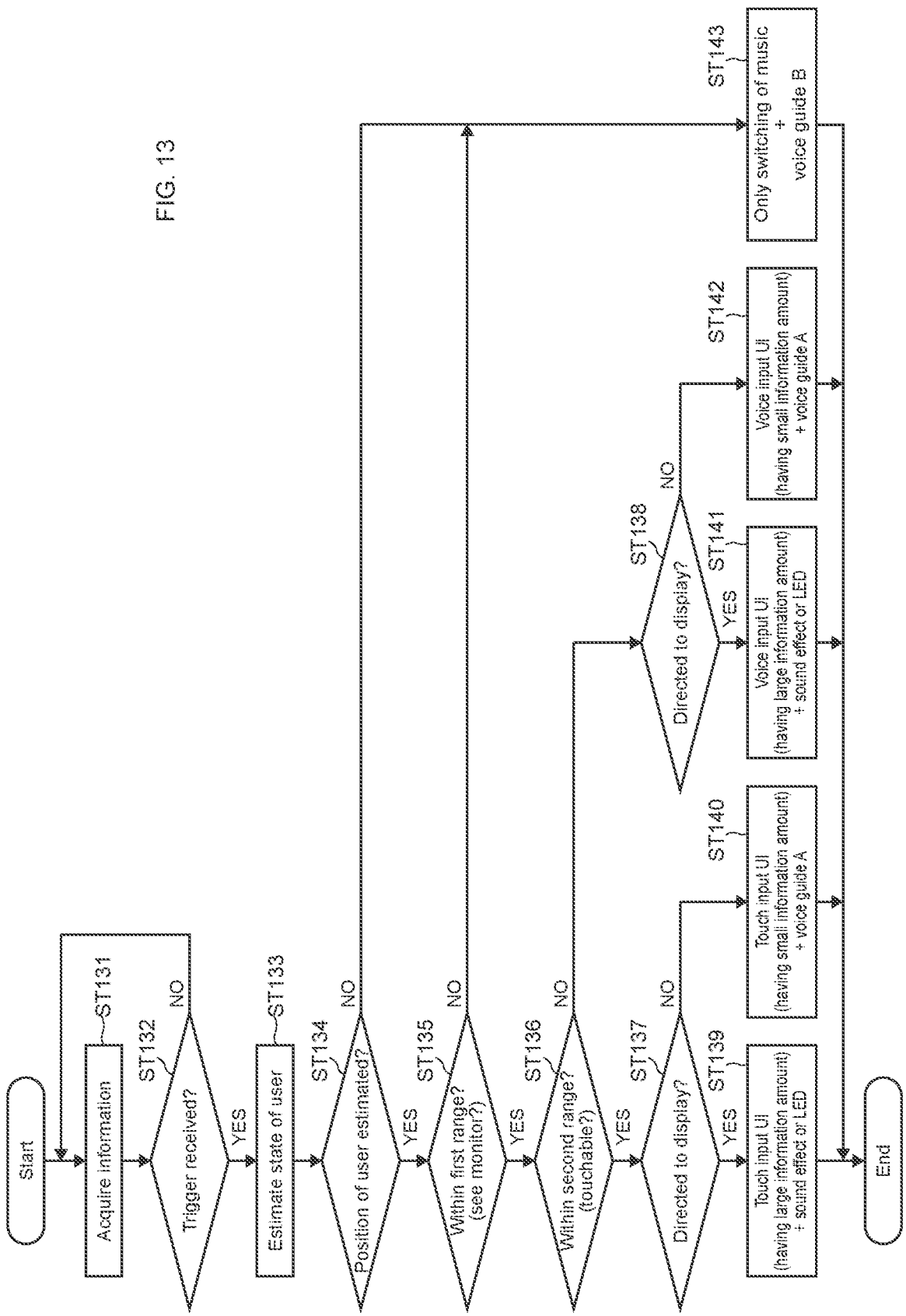
FIG. 13 is a flowchart showing the flow of processing for displaying the user interfaces considering the visual line of a user in the music reproduction system.

FIG. 13 is a flowchart showing the flow of processing for displaying the UIs considering the visual line of the user by the information processing terminal 100.

Figure 14:
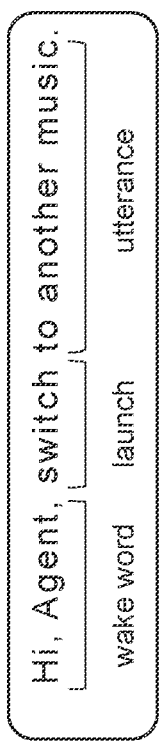
FIG. 14 is a diagram showing an example of music change instructions input to the information processing terminal through voice.

In FIG. 13, the processing of steps 131 to 136 is the same as that of steps 121 to 126 in FIG. 12. In this example, it is assumed that instructions to change currently-reproduced music to another music have been received as a trigger from the user through a voice input as shown in, for example, FIG. 14.

When determining in step 136 that the user exists beyond the second range in which the user is allowed to touch the display (No), the control unit 210 of the information processing server 200 determines whether the visual line of the user is directed to the display of the information processing terminal 100 on the basis of, for example, a captured image captured by the imager 26 (steps 137 and 138).

When determining that the user exists within the second range and the visual line of the user is directed to the display (Yes in step 137), the control unit 210 transmits an instruction signal for providing instructions on the display of the touch input UI having a large information amount and the output of a simple sound effect like, for example, "beep" or the lighting of a LED to the information processing terminal 100. Upon receiving the instruction signal, the CPU 11 of the information processing terminal 100 controls the touch panel to display the touch input UI (having a large information amount) as shown in FIG. 15B and controls the speaker to output the sound effect or lights up the LED (step 139).

The reason why the notification of the visual line of the user is provided through the sound effect or the LED is that a detailed voice guide seems to form an obstacle to the user when the user sees the display. Further, the information amount specifically refers to the number of pieces of content (music), the number of menus, the number of scroll bars, the amount of meta information, or the like.

When determining that the user exists within the second range and the visual line of the user is not directed to the display (No in step 137), the control unit 210 transmits an instruction signal for providing instructions on the display of the touch input UI having an information amount smaller than that of the above information and the output of a voice guide like, for example, "How about this music?" for guiding the visual line of the user to the display to the information processing terminal 100. Upon receiving the instruction signal, the CPU 11 of the information processing terminal 100 controls the touch panel to display the touch input UI (having a small information amount) as shown in FIG. 15C and controls the speaker to output the voice guide (step 140).

When determining that the user exists beyond the second range and the visual line of the user is directed to the display (Yes in step 138), the control unit 210 transmits an instruction signal for providing instructions on the display of the voice input UI having a large information amount and the output of a simple sound effect like, for example, "beep" or the lighting of the LED to the information processing terminal 100. Upon receiving the instruction signal, the CPU 11 of the information processing terminal 100 controls the touch panel to display the voice input UI (having a large information amount) as shown in FIG. 15D and controls the speaker to output the sound effect or light up the LED (step 141).

When determining that the user exists beyond the second range and the visual line of the user is not directed to the display (No in step 138), the control unit 210 transmits an instruction signal for providing instructions on the display of the voice input UI having an information amount smaller than that of the above information and the output of a voice guide like, for example, "How about this music?" to the information processing terminal 100. Upon receiving the instruction signal, the CPU 11 of the information processing terminal 100 controls the touch panel to display the voice input UI (having a small information amount) as shown in FIG. 15E and controls the speaker to output the voice guide (step 142).

When determining that the estimation of the position of the user is not allowed (No in step 134) or the user exists beyond the first range (No in step 135), the control unit 210 transmits an instruction signal for providing instructions on the switching of only the music to another music (for example, next music in a currently-reproduced album) without changing a current reproduction UI and the output of a voice guide like, for example, "Reproduce Song B1" for explaining the music to be switched to the information processing terminal 100. Upon receiving the instruction signal, the CPU 11 of the information processing terminal 100 controls the touch panel to switch the content without changing the UI as shown in FIG. 15F and controls the speaker to output the voice guide (step 143).

(Case in which Plurality of Users Exist)

The above description is given assuming that the information processing terminal 100 is operated by one user, but a case in which the information processing terminal 100 is operated by a plurality of users is also assumed.

Figure 16:
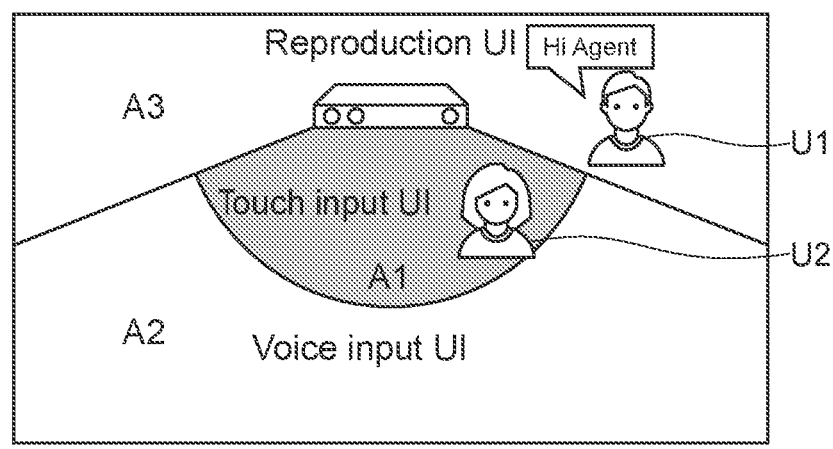
FIG. 16 is a diagram for describing the relationship between the positions of respective users and area ranges when the information processing terminal is operated by the plurality of users.

FIG. 16 is a diagram showing the relationship between the positions of respective users and area ranges when the information processing terminal 100 is operated by the plurality of users.

As shown in FIG. 16, two users, users U1 and U2 exist around the information processing terminal 100. The user U1 exists in an area range in which the user U1 is not allowed to see the display of the information processing terminal 100, i.e., the user U1 exists in an area range A3 of the reproduction UI. The user U2 exists in an area range in which the user U2 is allowed to touch the display of the information processing terminal 100, i.e., the user U2 exists in an area range A1 of the touch input UI. The information processing terminal 100 displays the UIs according to the areas in which the plurality of users exist as described above.

Figure 17:
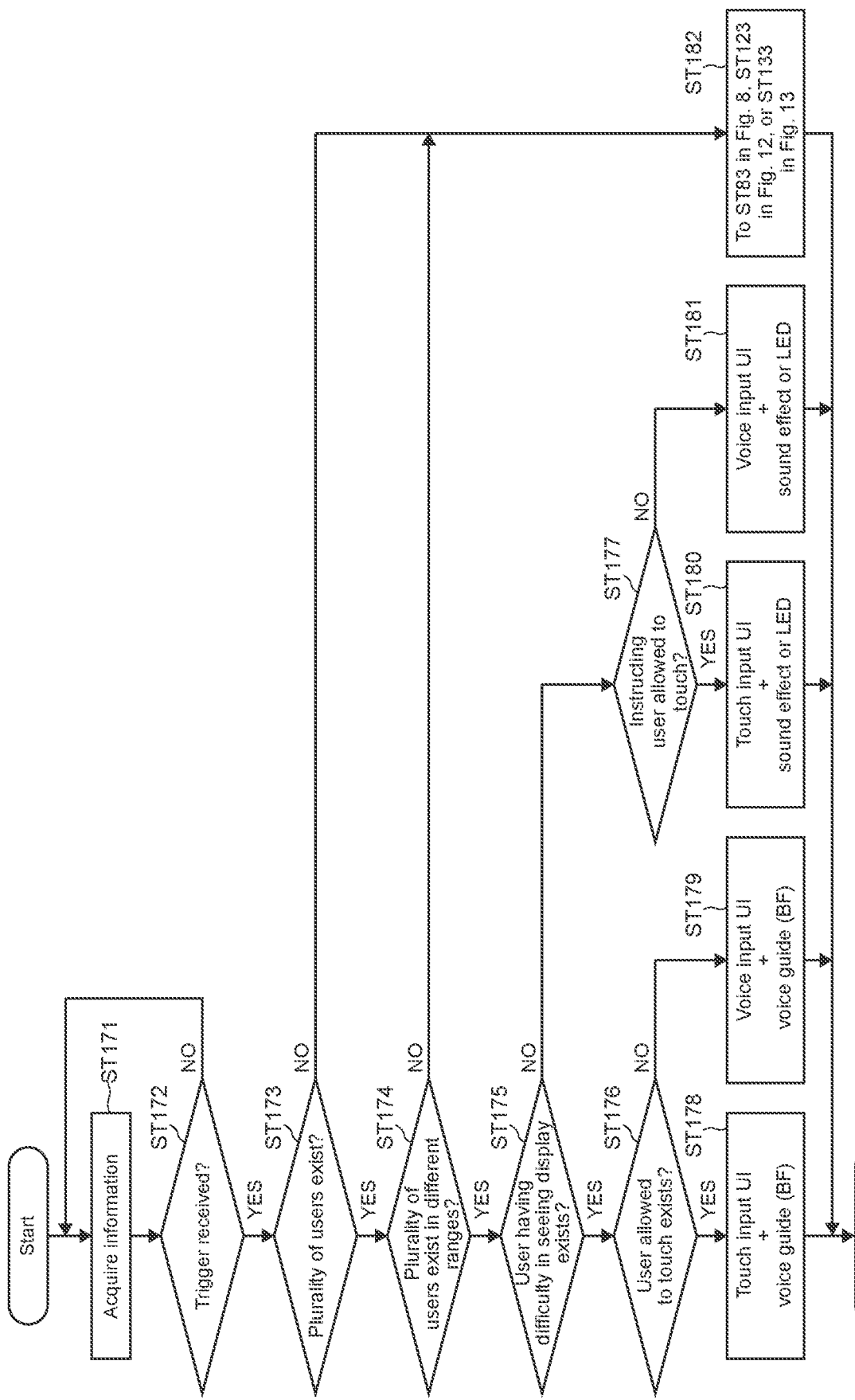
FIG. 17 is a flowchart showing the flow of processing for displaying the user interfaces according to the positions of the plurality of users in the music reproduction system.

FIG. 17 is a flowchart showing the flow of processing for displaying the UIs of the information processing terminal 100 according to the areas in which the plurality of users are positioned.

As shown in FIG. 17, the CPU 11 of the information processing terminal 100 acquires information from the input device 18, the imager 26, the sensor 27, or the like at any time (step 171) and determines whether a trigger has been received from the information (step 172).

When determining that the trigger has been received (for example, voice for providing instructions on the switching of music has been input) (Yes), the user recognition unit 250 of the information processing server 200 determines whether a plurality of users exist around the information processing terminal 100 on the basis of, for example, a captured image captured by the imager 26 (step 173).

When determining that the plurality of users do not exist (No), the information processing server 200 and the information processing terminal 100 perform the processing after step S83 in FIG. 8, the processing after step 123 in FIG. 12, or the processing after step 133 in FIG. 13.

When determining that the plurality of users exist (Yes), the user recognition unit 250 determines whether the users exist in different area ranges among the area ranges A1 to A3 from the captured image or the like (step 174).

When determining that the plurality of users exist in the same area ranges (No), the information processing server 200 and the information processing terminal 100 perform the processing after step S83 in FIG. 8, the processing after step 123 in FIG. 12, or the processing after step 133 in FIG. 13 like a case in which the information processing terminal 100 is operated by one user (step 182).

When determining that the plurality of users exist in the different area ranges (Yes), the user recognition unit 250 determines whether a user not allowed to see the display of the information processing terminal 100, i.e., a user positioned in the area range A3 exists on the basis of the captured image or the like (step 175).

When determining that the user not allowed to see the display exists (Yes), the user recognition unit 250 determines whether a user allowed to touch the display exists on the basis of the captured image or the like (step 176).

When determining that the user allowed to touch the display exists (Yes), the control unit 210 transmits an instruction signal for providing instructions on the display of the touch input UI for the user allowed to touch the display and the output of a voice guide like the one described in FIG. 13 by beamforming (transmission of sound waves in a specific direction) to the user not allowed to see the display to the information processing terminal 100. Upon receiving the instruction signal, the CPU 11 of the information processing terminal 100 displays the touch input UI and controls the speaker to output the voice guide having directivity for the user not allowed to see the display only with, for example, the speaker responding to the area range A3 on the rear side of the information processing terminal 100 (step 178). Thus, the user allowed to see the display is free from the voice guide, while the user not allowed to see the display is given proper information.

When determining that the user allowed to touch the display does not exist (No), the control unit 210 transmits an instruction signal for providing instructions on the display of the voice input UI for the user allowed to see the display and the output of the voice guide to the user not allowed to see the display to the information processing terminal 100. Upon receiving the instruction signal, the CPU 11 of the information processing terminal 100 displays the voice input UI and controls the speaker to output the voice guide by the beamforming in the manner as described above (step 179).

When determining in step 175 that the user not allowed to see the display does not exist (No), the control unit 210 determines whether an instructing user (user who has pulled the trigger) is allowed to touch the display (whether the user exists in the area range A1) (step 177).

Here, the specification of the instructing user may be performed by the matching between the position of a microphone through which the voice of the trigger has been input among a plurality of microphones provided in the information processing terminal 100 and the position of the user in the captured image.

When determining that the instructing user is allowed to touch the display (Yes), the control unit 210 transmits an instruction signal for providing instructions on the display of the touch input UI and the output of a sound effect like the one in FIG. 13 or the lighting of the LED to the information processing terminal 100. Upon receiving the instruction signal, the CPU 11 of the information processing terminal 100 controls the touch panel to display the touch input UI and controls the speaker to output the sound effect or lights up the LED (step 180).

When determining that the instructing user is not allowed to touch the display (No), the control unit 210 transmits an instruction signal for providing instructions on the display of the voice input UI and the output of the sound effect or the lighting of the LED to the information processing terminal 100. Upon receiving the instruction signal, the CPU 11 of the information processing terminal 100 controls the touch panel to display the voice input UI and controls the speaker to output the sound effect or lights up the LED (step 181).

The voice guide by the beamforming may be output not only to the user not allowed to see the display of the information processing terminal 100 but also to the user allowed to see the display. On this occasion, the CPU 11 may control the speaker such that the content of the voice guide for the user not allowed to see the display and the content of the voice guide for the user allowed to see the display are made different from each other to be output. Further, when the information processing terminal 100 is operated only by a specific instructing user among a plurality of users, the CPU 11 may control the speaker such that the voice guide is output only to the instructing user by the beamforming.

Further, the CPU 11 may specify the position of a user farthest from the information processing terminal 100 or a user closest to the information processing terminal 100 among a plurality of users in cooperation with the information processing server 200 and control the touch panel to display the UIs according to the position (according to which of the area ranges A1 to A3 corresponds to the position).

Further, the CPU 11 may specify the mean (average) position between the positions of a plurality of users and control the touch panel to display the UIs according to the position.

In addition, the CPU may specify a user who has his/her eyes turned to the display among a plurality of users and control the touch panel to display the UIs according to the position of the user.

The above example shows a case in which instructions from the user are clear, but a case in which instructions from the user are not clear is also assumed. In this case as well, the CPU 11 may determine the distance of the user from the information processing terminal 100, an area range in which the user exists, and the fact that the user has his/her eyes turned to the information processing terminal 100 from, for example, a captured image captured by the imager 26, and perform the processing according to a result of the determination. The case also includes processing related to applications or services other than the music application. The distance and the area ranges may be determined on the basis of the sensing data of a distance sensor or an external sensor (such as a distance sensor and an indoor camera) provided in the information processing terminal 100.

Figure 18:
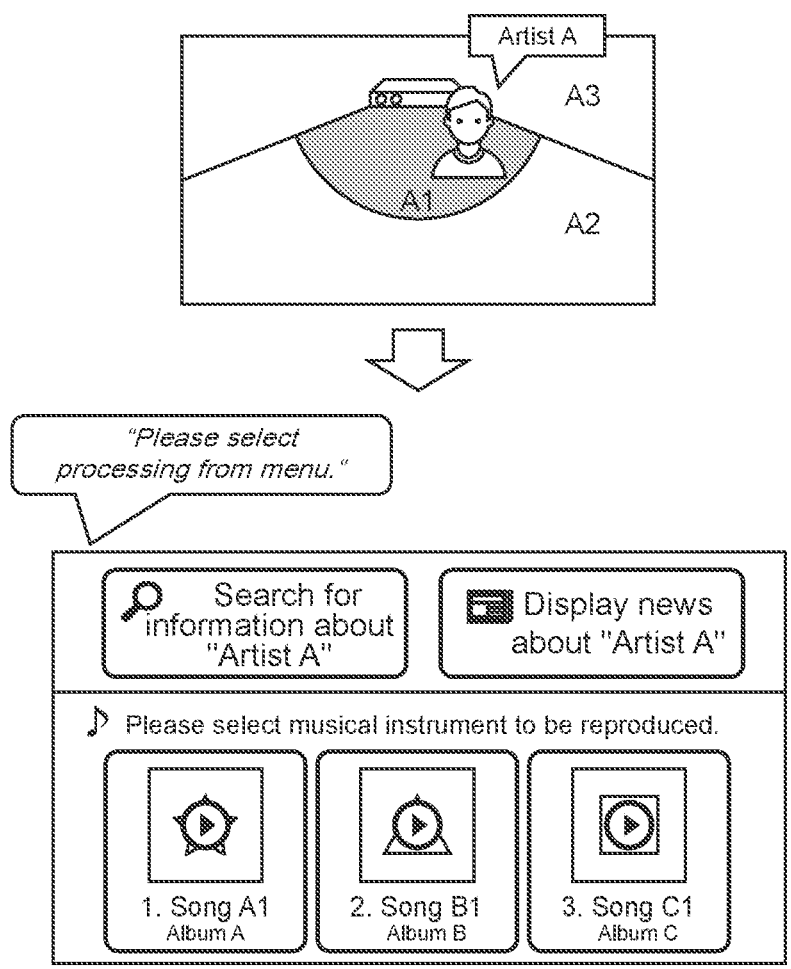
FIG. 18 is a diagram showing another example of a user interface displayed when the user exists at a position close to the information processing terminal in the music reproduction system.

For example, when the voice "(Hi, Agent!), Artist A" is input from the user and the user exists at a position at which the user is allowed to touch the information processing terminal 100 or has his/her eyes turned to the information processing terminal 100, the CPU 11 may display a UI containing a web search and a news display related to the artist A as a selection menu, besides a list for causing the user to select the music of the artist A as shown in FIG. 18.

Figure 19:
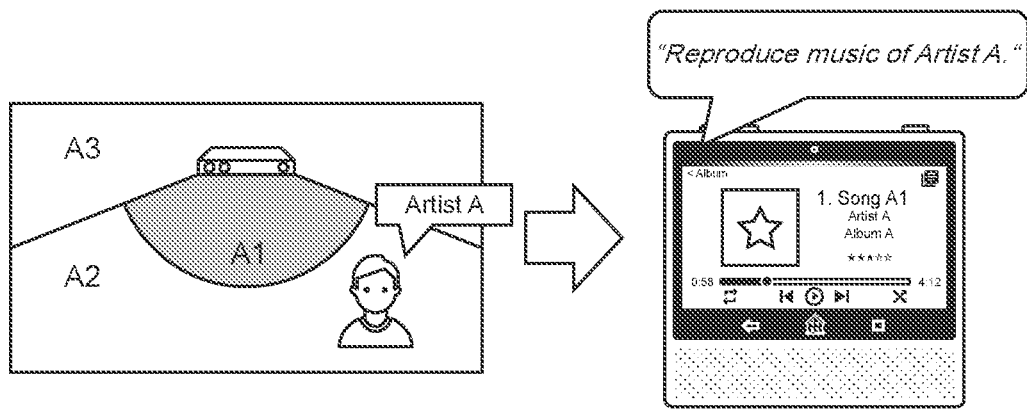
FIG. 19 is a diagram showing another example of a user interface displayed when the user exists at a position distant from the information processing terminal in the music reproduction system.

Further, when instructions from the user are not clear and the user exists at a position distant from the information processing terminal 100 or does not have his/her eyes turned to the information processing terminal 100, the CPU 11 may ask the user to repeat the content of instructions through voice or predict processing to be performed and automatically perform reproduction processing or list display processing. FIG. 19 shows a state in which the CPU 11 predicts that "the user has provided instructions to reproduce the music of Artist A" and performs processing when the voice "(Hi, Agent), Artist A" has been input.

Further, when the level of sound around the information processing terminal 100 is a prescribed level or more or when it is estimated from sensing information that a voice input environment is poor due to the activation of other AV equipment such as a television set or the like, the CPU 11 may broaden a distance/range for presenting the touch input UI that is more reliable as an operation input unit.

For example, assuming that a distance from the information processing terminal 100 to the user, which serves as a criterion for determining the display of one of the touch input UI and the voice input UI, is 1 m when a voice input environment is good, the criterion distance may be changed to 3 m when the level of sound around the information processing terminal 100 is detected to be the prescribed value or more or when other AV equipment are activated. Thus, an input error in the voice input UI is prevented.

Further, the CPU 11 may display a UI, an icon, a bar, or the like for showing recognition sensitivity or accuracy in voice input according to the voice input environment on the display. For example, the CPU 11 may change the color of a bar at the upper part or the color of a microphone icon at the center of an icon group of the screen in FIG. 2 (for example, the color changes to red when the voice input environment is good or changes to blue when the voice input environment is poor).

Thus, for example, when the CPU 11 displays the touch input UI due to poor voice recognition accuracy, the user is allowed to intuitively understand the fact that the touch input UI has been displayed due to a failure in voice recognition and thus naturally select a touch input instead of a voice input.

In the above description, the CPU 11 may further switch the display of the UIs in consideration of the posture of the user. That is, the CPU 11 may display the voice input UI when the user is detected to lies down even if the user exists at a position close to the information processing terminal 100. Thus, the user lying down eliminates the inconvenience of getting up to touch the display. Information on the posture is acquired from a captured image captured by the imager 26 or an external sensor (such as a sensor in a bed, a wearable terminal attached to the user, and an indoor camera).

Alternatively, the CPU 11 may display the reproduction UI when the user is detected to lie down. Thus, the user lying down and not even seeing the display eliminates the inconvenience of seeing a UI on the display to select processing.

In the above example, it is assumed that the touch input UI and the voice input UI are provided in the music application in advance. However, a case in which the touch input UI and the voice input UI are not provided depending on applications or services is also assumed. In this case, when a service side provides UIs that are not equivalent to the touch/voice input interfaces but are patterns different from each other, the CPU 11 may use the UIs as the touch/voice input UIs.

For example, when a UI having a large number of pieces of content and a UI having a small number of pieces of content exist, the CPU 11 uses the former as the touch input UI and the latter as the voice input UI. Further, when a page for tablet terminals and a page for smart phones are provided, the CPU 11 may use the former as the touch input UI and the latter as the voice input UI.

Figure 20C:
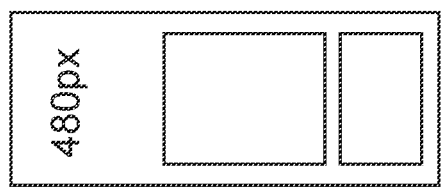
FIGS. 20A, 20B, and 20C are diagrams for describing a change in the resolution of the user interfaces displayed in the music reproduction system.
Figure 20B:
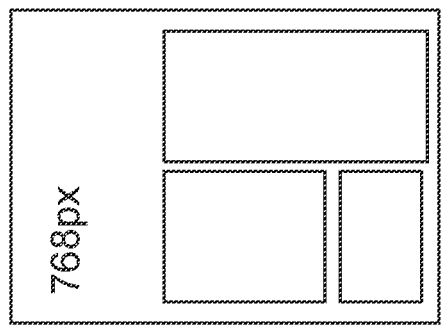
Figure 20A:
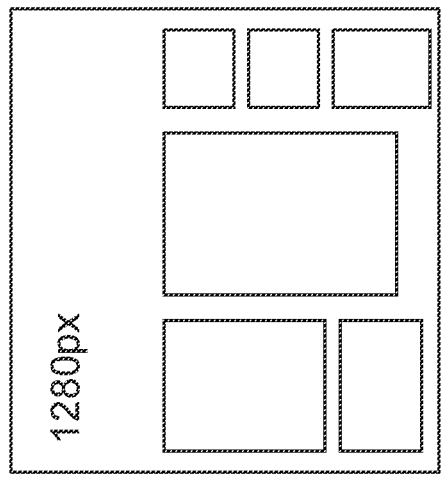

Further, when a web page on a service side is created on the basis of responsive design, the CPU 11 virtually changes resolution information on the page. As shown in FIGS. 20A, 20B, and 20C, the CPU 11 may use a high-resolution page (FIG. 20A) as the touch input UI and a low-resolution page (FIG. 20B or 20C) as the voice input UI.

Further, when the UIs of different patterns as described above are not provided, the CPU 11 may change the sizes of pieces of content (images or fonts) to display the touch input UI and the voice input UI so as to be distinguished from each other.

Further, when a page on a service side has links or alternatives, the CPU 11 may display the page as it is to use the same as the touch input UI or may assign voice instruction icons such as numbers to the links or the alternatives to use the page as the voice input UI.

Thus, the information processing terminal 100 is allowed to provide a proper UI corresponding to an input unit even in applications or services in which the touch input UI and the voice input UI are not provided in advance.

In the above example, the UIs in the music application are described. However, it is possible to realize the processing for switching between the voice input UI and the touch input UI according to a context such as the distance, the range, the visual line of the user in other applications as well.

Figure 21A:
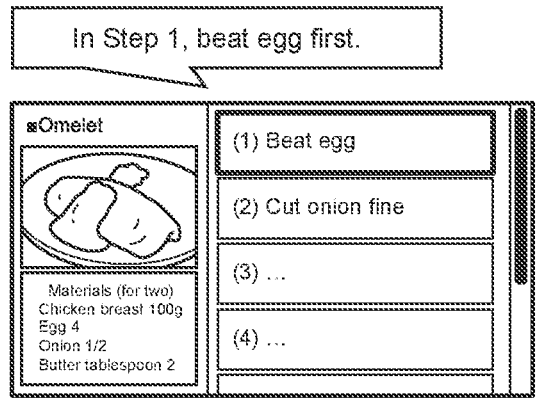
FIGS. 21A, 21B, and 21C are diagrams showing examples of the user interfaces displayed when the music reproduction system is applied to a recipe reproduction system.
Figure 21B:
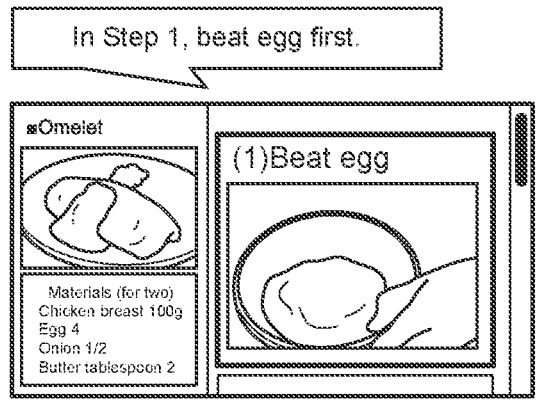
Figure 21C:
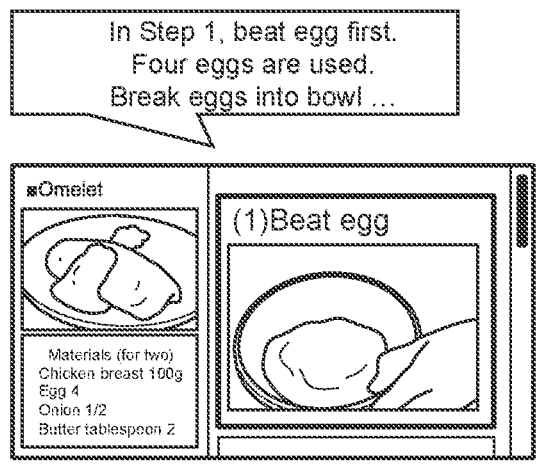

As an example, FIGS. 21A, 21B, and 21C show UIs corresponding to steps 86 to 88 in FIGS. 8, 10B, 10C, and 10D as UIs displayed in a cooking application.

FIGS. 21A, 21B, and 21C show the touch input UI, the voice input UI, and the reproduction UI, respectively. The touch input UI has a large amount of screen information (character information) and a small amount of voice information output together with the character information. The voice input UI has a small amount of screen information (the character information is replaced by pictures) and a small amount of accompanying voice information. The reproduction UI has a small amount of screen information and a large amount of voice information.

In the above example, the information processing terminal 100 and the information processing server 200 may determine the UIs by learning at least one of the position, the visual line, the posture, or the expression of the user and the UIs used by the user at that time or the content of instructions from the user so as to be associated with each other.

As a learning method, neural network or deep learning is, for example, used. The neural network is a model imitating the cerebral nerve circuit of a human and composed of the three types of layers of an input layer, an intermediate layer (hidden layer), and an output layer. Further, the deep learning is a model using a neural network having a multilayer structure. In the deep learning, it is possible to repeatedly learn characteristics in respective layers and learn a complicated pattern hidden in large amount of data. The deep learning is used to discriminate, for example, an object in an image or a word in voice.

When the deep learning is used, the input of the deep learning may be the position, the posture, the expression, the visual line, or the like of the user and the output thereof may be the touch input UI, the voice input UI, or the like.

Further, as a hardware structure for realizing such machine learning, a neuro chip/neuromorphic chip in which the concept of a neural network is embedded may be used.

Further, in the problem setting of machine learning, supervised learning, unsupervised learning, semi-supervised learning, reinforcement learning, inverse reinforcement learning, active learning, transfer learning, or the like is used. For example, in the supervised learning, a feature amount is learned on the basis of assigned labeled learning data (training data). Thus, it becomes possible to derive the label of unknown data.

Further, in the unsupervised learning, a large amount of unlabeled learning data is analyzed to extract a feature amount, and clustering is performed on the basis of the extracted feature amount. Thus, it becomes possible to analyze a tendency or predict the future on the basis of an enormous amount of unknown data.

Further, the semi-supervised learning is one in which the supervised learning and the unsupervised learning are mixed together. In the method of the semi-supervised learning, an enormous amount of training data is given by the unsupervised learning after a feature amount is learned by the supervised learning. Thus, the learning is repeatedly performed, while the feature amount is automatically calculated.

Further, the reinforcement learning handles a problem in which an agent in an environment observes a current state to determine an action to be taken. The agent selects an action to receive a reward from the environment and learns measures for obtaining a maximum reward through a series of actions. As described above, it becomes possible to learn an optimum solution in an environment to reproduce human judgement and causes a computer to learn judgement beyond a human.

In the above example, the touch input UI and the voice input UI are shown as the UIs to be switched. However, other UIs such as a gesture input UI, a visual-line input UI, a remote input UI, and a proximity sensor input UI may be displayed in a switching manner. For example, in the above example, the CPU 11 may control the touch panel to display the visual-line input UI instead of the touch input UI and display the gesture input UI instead of the voice input UI.

In the above example, the display of the UIs is switched on the basis of the determination result of the distance between the user and the information processing terminal 100, the area ranges in which the user exists, the direction of the eye line of the user to the information processing terminal 100, or the like. However, the CPU 11 may switch the display of the UIs on the basis of profile information on the sense of hearing or the sense of vision of the user. For example, the CPU 11 may control the touch panel to display the touch input UI when determining from the profile information that the recognized user has a hearing defect or display the voice input UI when determining from the profile information that the user does not have the hearing defect. Further, the CPU 11 may control the touch panel to display the gesture input UI, the visual-line input UI, the proximity sensor input UI, or the remote input UI instead of the voice input UI in the above example when determining that the recognized user has the hearing defect.

Second Embodiment

Next, a second embodiment of the present technology will be described. In the present embodiment, portions having the same functions and configurations as those of the first embodiment will be denoted by the same symbols and their duplicated descriptions will be omitted or simplified.

The embodiment described above shows the processing in which the UIs for reproducing music in the music application are changed according to the context of the user. Meanwhile, as for pieces of content such as recipes and electronic books, the user has need to perform an operation such as turning of pages (on a step-by-step basis) after reproducing the pieces of content unlike media content such as music and moving pictures.

The present embodiment will describe, using a cooking application (recipe reproduction system) as an example, processing for controlling the switching of a plurality of reproduction steps of content on the basis of user context information containing a user state (such as the position, the posture, the visual line, and the expression of the user), a user profile, or user environment information or sensing information collected from other devices.

The cooking application may be one that downloads information such as recipes, images, and pieces of content from a user's posting service such as "Cookpad" and "allrecipes.com" via the Internet, and that displays the information while controlling the switching of the reproduction steps. Alternatively, the cooking application may be one that streams the information while controlling the switching of the reproduction steps.

FIGS. 22A, 22B, 22C, 22D, and 22E are diagrams for describing the flow of processing for reproducing a recipe in the recipe reproduction system according to the present embodiment.

Figure 22A:
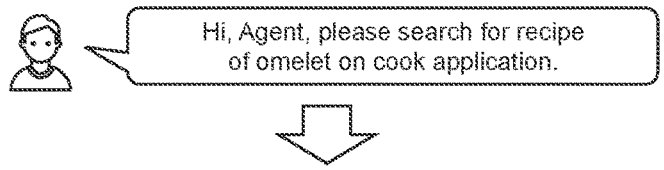
FIGS. 22A, 22B, 22C, 22D, and 22E are diagrams for describing the flow of processing for reproducing recipes in a recipe reproduction system according to a second embodiment of the present technology.

As shown in FIG. 22A, the user activates the cooking application through a voice input from the home screen shown in FIG. 2 and instructs the CPU 11 to search for the recipes of a specific food (for example, an omelet).

Figure 22B:
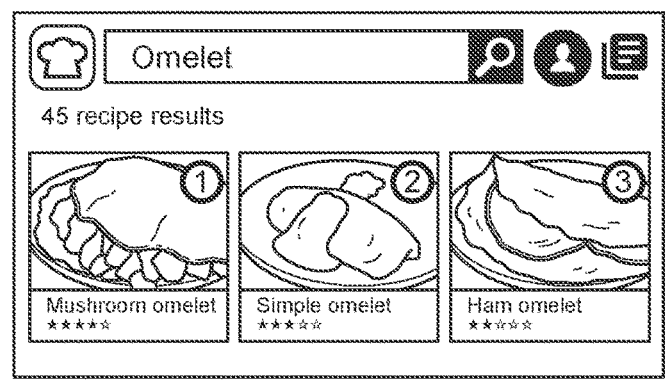

After recognizing the voice input, the CPU 11 of the information processing terminal 100 displays the search results of the recipes of the corresponding food on the display and notifies the user of the number of the search results through voice as shown in FIG. 22B.

Figure 22C:
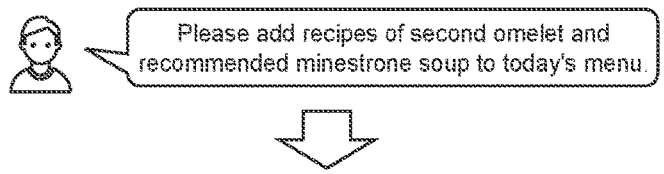
Figure 22D:
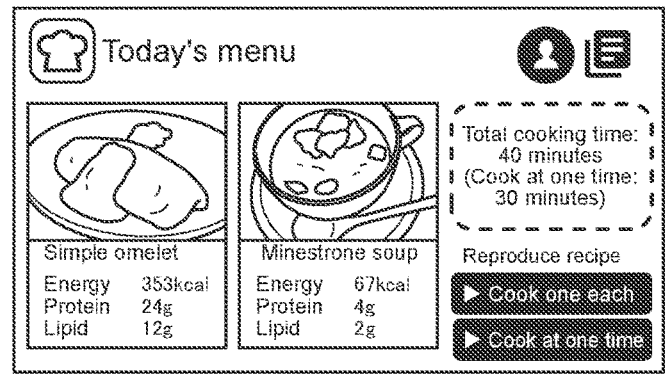

The user instructs the CPU 11 to add specific recipes in the search results to "Today's Menu" through a voice input as shown in FIG. 22C.

After recognizing the voice input, the CPU 11 displays a page in which the recipes have been added to the "Today's Menu" on the display and notifies the user of the addition and the cooking times of the respective recipes through voice. The cooking times may be input by users who have posted the recipes to the service, or may be posted and additionally registered by users who have actually reproduced the recipes. Further, the service side may record times needed to reproduce the recipes by a plurality of users and output the average.

Figure 22E:
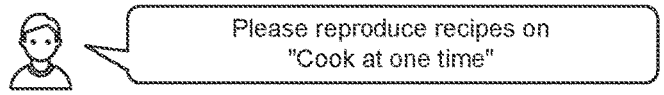

On this occasion, the CPU 11 also displays buttons for causing the user to select either "cook one each" or "cook at one time" to reproduce the plurality of recipes. The "cook one each" is a mode in which food is cooked one each, and the order of cooked food is suggested by the information processing terminal 100 (may be selected by the user). The "cook at one time" is a mode in which a procedure for reproducing a plurality of selected recipes at one time is presented by the information processing terminal 100. In the present embodiment, it is assumed that the CPU 11 has been requested by the user to select "the cook at one time" through a voice input as shown in FIG. 22E.

As for the "cook at one time," a known method may be used. That is, the CPU 11 solves an optimization problem for minimizing a time on the basis of operations (such as cutting, frying, and boiling) or the number of persons described in the recipes and operational environments (such as the number of stoves and the number of pans or knives) in a user profile.

The CPU 11 may acquire foodstuffs in a refrigerator as sensing data instead of the instructions to search for the recipes from the user and suggest recipes containing the foodstuffs to the user. In this case, a sensor (such as a camera) and a transmitter are provided in the refrigerator, and information on the foodstuffs sensed by the sensor is transmitted by the transmitter to the information processing terminal 100 as the sensing data.

Figure 23:
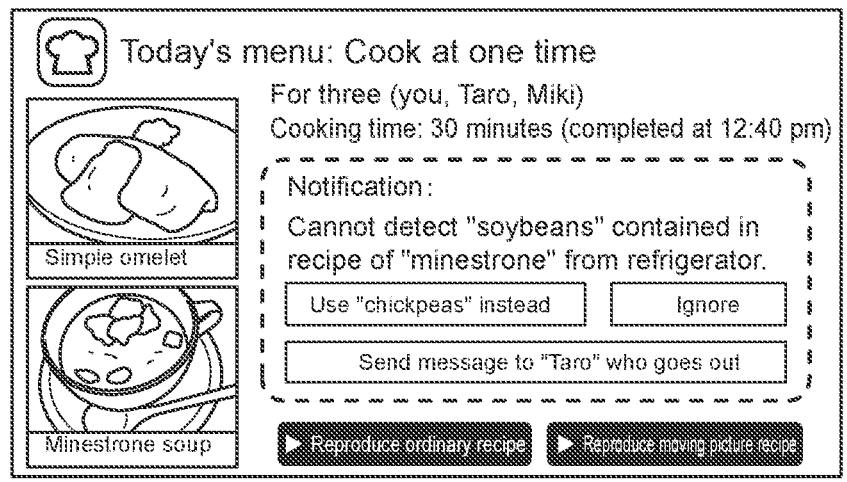
FIG. 23 is a diagram for describing notification processing before starting the reproduction of the recipes in the recipe reproduction system.

FIG. 23 is a diagram for describing the screen of the cooking application before starting the reproduction of the recipes in the recipe reproduction system.

The information processing terminal 100 displays a notification message about the preparation of foodstuffs as indicated by, for example, a dashed-line portion in FIG. 23. The following notification messages are assumed.

- When the comparison between recipe data and the user profile shows that an allergy-provoking foodstuff registered in the user profile is contained in the recipe data, the CPU 11 displays an alert on the display. The alert may be output from the speaker as an alert sound or an alert message.
- When a substitute foodstuff is detected to be present in the refrigerator or a shelf, the CPU 11 suggests the substitute foodstuff (e.g., soybeans→chickpeas).
- When the acquisition of workout information or diet information from a health care application installed in the information processing terminal 100 shows that calorie information on the recipes exceeds a prescribed value, the CPU 11 may display an alert on the display. The alert may be output from the speaker as an alert sound or an alert message.
- The CPU 11 may add a foodstuff lacking in the foodstuffs of the recipes among the foodstuffs of the refrigerator or the like to a cart or a wish list at an EC (Electronic Commerce) site, or may suggest the same.
- When reference to whereabout information on a family user shows that the family user is away from home, the CPU 11 may transmit a message or get confirmation to ask for buying the foodstuff from the information processing terminal 100 to a mobile device such as a smart phone of the user. Then, when the buying of the foodstuff is permitted by the family user, the CPU 11 may change the order of the recipes according to the estimated return time of the user.

Next, processing for setting cooking time will be described as a function before starting the reproduction of the recipes.

When cooking complete time is specified by the user, the CPU 11 may suggest the change of cooking start time. For example, when the comparison between cooking complete time desired by the user and an estimated cooking time shows that cooking could be completed earlier than the time desired by the user, the CPU 11 may suggest proper cooking start time to the user.

Besides, in the generation of the recipes based on the "cook at one time," the CPU 11 may optimize a cooking time to be approximated to time desired by the user rather than being approximated to a minimum cooking time.

Further, when the recipes include pieces of moving picture content, the CPU 11 may adjust a moving picture reproduction speed to adjust the cooking complete time.

Further, when determining that scheduled cooking complete time passes the cooking complete time desired by the user, the CPU 11 may suggest recipes for shorter cooking time.

Further, the CPU 11 may acquire positional information and past action history information on a person who goes out and present cooking start time to the user on the basis of the estimated return time of the person.

Figure 24:
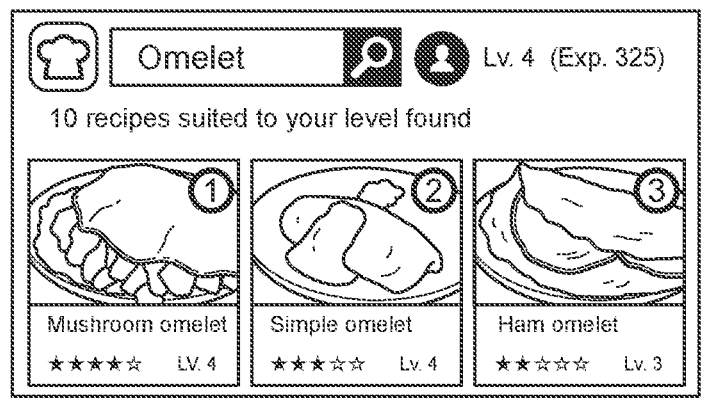
FIG. 24 is a diagram for describing another example of the processing for reproducing the recipes in the recipe reproduction system.

Further, the CPU 11 may set an experience value (Exp.) and a level according to the user's total number of recipe viewing times in the past and present menus corresponding to the user level at the time of searching for the menus. FIG. 24 is a diagram showing an example of a recipe suggesting screen in which menus corresponding to the user having an experience value (Exp.) of 325 are suggested.

Further, the CPU 11 may present recipes according to recipe information used by the user in the past. For example, when used information on foodstuffs or operations (such as frying and cutting) is stored in the information processing server 200 for each recipe, the CPU 11 may suggest recipes using, for example, foodstuffs or cooking methods frequently used by the user according to the information.

Next, recipe data will be described. FIG. 26 is a diagram showing an example of recipe data using pieces of moving picture content in the present embodiment.

As shown in FIG. 26, the recipe data has data related to the respective reproduction step names of a recipe, the start time of the moving pictures of the respective reproduction steps, the pieces of content of cooking processes corresponding to the respective reproduction steps, user's operations included in the cooking processes, foodstuffs, quantities, and used appliances.

Among them, data related to the operations, the foodstuffs, the quantities, and the appliances may be set by the user. Alternatively, the step names and the pieces of content may be set by the user, and the moving picture time, the operations, the foodstuffs, the quantities, and the appliances may be estimated and set by the system (the information processing terminal 100 or the information processing server 200) according to moving pictures or pieces of moving picture content.

Figure 25A:
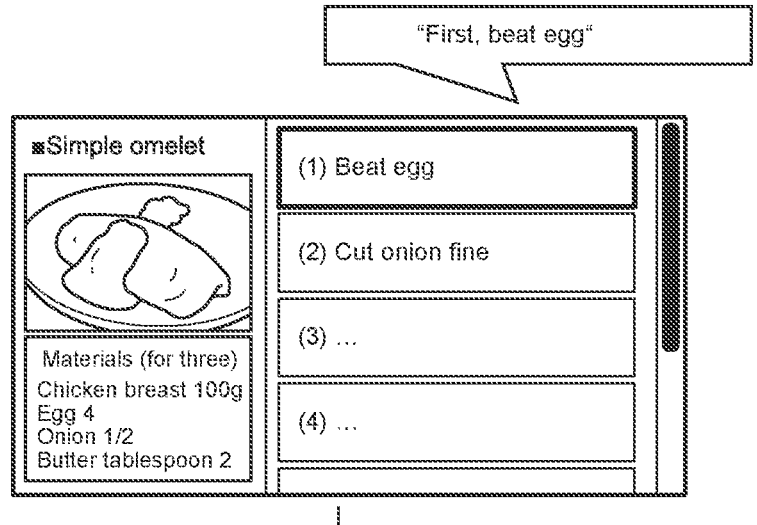
FIGS. 25A, 25B, and 25C are diagrams showing an example of processing for switching the reproduction steps in the recipe reproduction system.
Figure 25B:
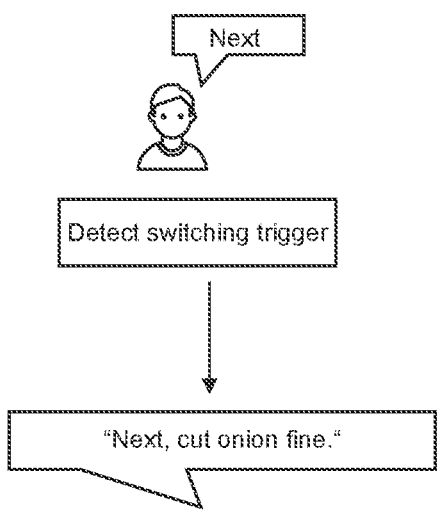
Figure 25C:
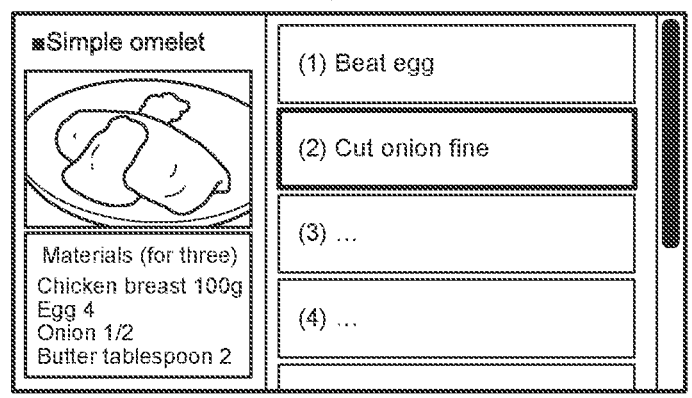
Figure 27A:
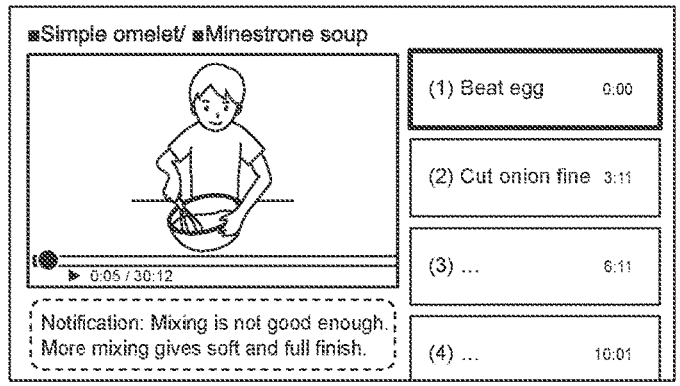
Figure 27C:
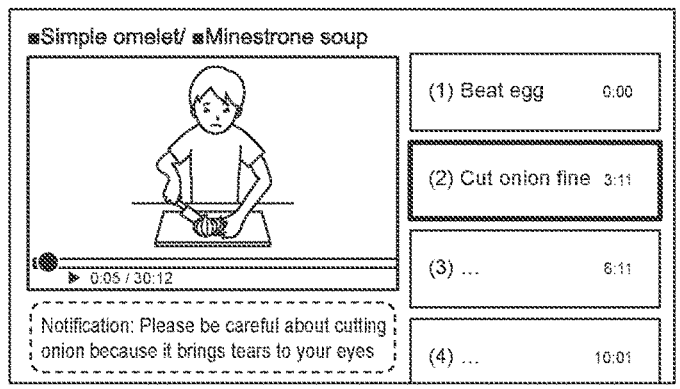

Next, the operations of the information processing terminal 100 and the information processing server 200 during the reproduction of a recipe will be described. FIGS. 25A, 25B, and 25C are diagrams showing an example of processing for switching the reproduction steps of a recipe by the information processing terminal 100 and the information processing server 200.

As shown in FIG. 25A, the reproduced recipe is configured as moving picture content (recipe moving picture) having a plurality of steps and stored on the information processing server 200. The recipe moving picture is reproduced on a step-by-step basis by TTS (Timestamped Transport Stream).

In the recipe moving picture, (the start times) of the respective steps are marked so as to be associated with reproduction time on the moving picture content. The marking may be set by a poster or a service user, or the information processing server 200 may analyze and automatically set a spot at which a service user pauses the moving picture many times. Further, the information processing server 200 may analyze and automatically mark the recipe moving picture.

As shown in FIG. 25A, the recipe moving picture is reproduced on a step-by-step basis. When reproduced to a next marked reproduction position (start time in a next step), the moving picture is automatically paused.

Then, as shown in FIGS. 25B and 25C, the CPU 11 reproduces the next step in the recipe moving picture when acquiring a switching trigger from the user. The recognition of the switching trigger is performed by the control unit 210 of the information processing server 200, and a result of the processing is transmitted to the information processing terminal 100.

Further, for example, at the left lower part of the screen on which the recipe moving picture is reproduced, an area for displaying notification from the information processing terminal 100 to the user is provided as a notification area. Further, the same content as that of the notification may be output as voice, besides the display of the notification in the notification area.

As an example of the notification content, the information processing server 200 may analyze the operations of the user and generate advice as shown in FIG. 25A. The control unit 210 of the information processing server 200 may generate the advice (such as "mixing is not good enough" and "cut vegetables are oversize") by analyzing an input from the imager 26, or may generate the advice (such as "heat is low" and "fried too much") on the basis of information acquired from cooking appliances.

Further, when instructed by the user to perform an application or a service (such as the reproduction of music and the reproduction of news) other than a cooking application, the CPU 11 may reflect information on a currently-performed cooking operation on processing corresponding to the instruction. For example, when instructed by the user to "reproduce recommended music," the CPU 11 may search for and reproduce "music containing an omelet in its title" or may search for and reproduce a "playlist having a reproduction time close to a left cooking time" in cooperation with the control unit 210 of the information processing server 200. Thus, the CPU 11 is allowed to make the user more relaxed during cooking or give useful information for cooking to the user.

Further, as the switching trigger of the reproduction steps, the CPU 11 acquires intended instructions to switch the reproduction steps from the user or determines the reproduction steps for itself and switches the same.

As the former example of the switching trigger, voice instructions such as "please teach next," "Next," "Go," and "OK" are provided.

Further, the CPU 11 and the control unit 210 may recognize the gesture or the visual line of the user from a camera as user's instructions. Examples of the gesture include a swipe operation, a prescribed hand sign (such as thumbs-up), and blinking. In order to prevent false instructions, the CPU 11 and the control unit 210 may switch to a next reproduction step only when both voice and a gesture (or a visual line) are detected.

As the latter example of the switching trigger, the CPU 11 and the control unit 210 may recognize the action of the user or the states of foodstuffs from a camera image and switch the reproduction steps when determining that the user has completed a cooking operation corresponding to a current reproduction step.

Further, the CPU 11 and the control unit 210 may switch the reproduction steps when determining that a cooking operation corresponding to a current reproduction step has been completed on the basis of sensing information from other devices (such as a stove, a smart knife, and a wearable terminal).

For example, when having been instructed by the recipe in the reproduction steps to "heat xxx for xxx minute(s)," the CPU 11 switches the reproduction steps, provided that a stove recognizes the setting of a pan due to its weight, and that the CPU 11 and the control unit 210 detect the heating of xxx for xxx minute(s).

Further, when having been instructed by a recipe in the reproduction steps to "cut xxx fine," the CPU 11 switches the reproduction steps, provided that a sensor in a smart knife detects fine cut (frequent movement of the knife in a vertical direction) and then the complete of the fine cut (or the putting of the knife in a place) is sensed from sensing information.

Further, the CPU 11 may recognize an action related to cooking on the basis of sensing information from a wearable terminal attached to the user. For example, the CPU 11 and the control unit 210 may acquire information from an acceleration sensor and a gyro sensor included in a smart list band and learn a cooking action (such as cutting, frying, and mixing) on the basis of the information to recognize the action of the user. The CPU 11 and the control unit 210 switch the reproduction steps when determining that cooking actions included in respective cooking processes have been completed.

As described above, the CPU 11 is allowed to determine the complete of a cooking process from the states of foodstuffs recognizable by the action of the user or sensing information and switch to a reproduction step in a next cooking process without receiving explicit instructions from the user.

Figure 28:
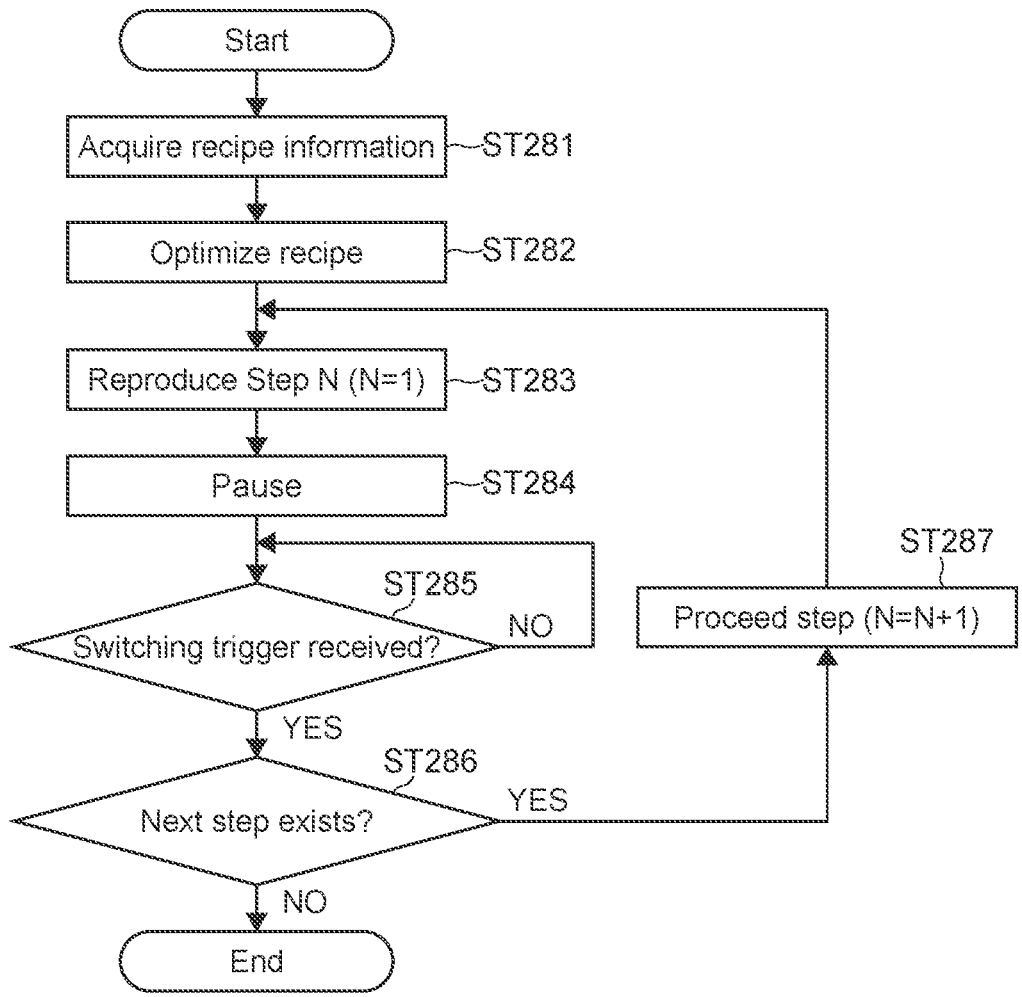
FIG. 28 is a flowchart showing the flow of the processing for switching the reproduction steps using the pieces of moving picture content in the recipe reproduction system.

FIG. 28 is a flowchart showing the flow of the processing for switching the reproduction steps.

As shown in FIG. 28, the CPU 11 first acquires recipe information from the information processing server 200 on the basis of user's searching instructions as described above (step 281).

Next, the CPU 11 and the control unit 210 perform processing for optimizing the recipe such as a cooking time and foodstuffs as described above (step 282).

Then, the CPU 11 reproduces a step N (N=1) in a recipe moving picture (step 283).

Next, the CPU 11 pauses the recipe moving picture when the reproduction of the step N ends (step 284).

Then, the CPU 11 and the control unit 210 determine whether the switching trigger has been received (step 285).

The recognition of the switching trigger is performed mainly by the control unit 210 of the information processing server 200 as described above. After recognizing the switching trigger, the control unit 210 generates step switching information for providing instructions on the switching of the reproduction steps and transmits the generated step switching information to the information processing terminal 100.

When determining that the switching trigger has been received (the step switching information has been received) (Yes), the CPU 11 determines whether the recipe moving picture has a next step (step 286).

When determining that the recipe moving picture has the next step (Yes), the CPU 11 increments the step N to proceed the reproduction steps to the next step (step 287) and repeatedly performs the processing after step 283 until the last reproduction step.

The recognition of the switching trigger may be performed by the CPU 11 of the information processing terminal 100. In this case, the step switching information is generated when the CPU 11 recognizes the switching trigger and recognizes the next step. The step switching information in this case becomes instructions to switch to the next step in a recipe moving picture for a cooking application.

In the flowchart, the CPU 11 switches the reproduction steps by reproducing, pausing, and resuming the recipe moving picture. However, for example, when instructed by the user, the CPU 11 may fast-forward the recipe moving picture for a prescribed time or until a next reproduction step or may rewind the recipe moving picture for a prescribed time or to a previous reproduction step.

Figure 29A:
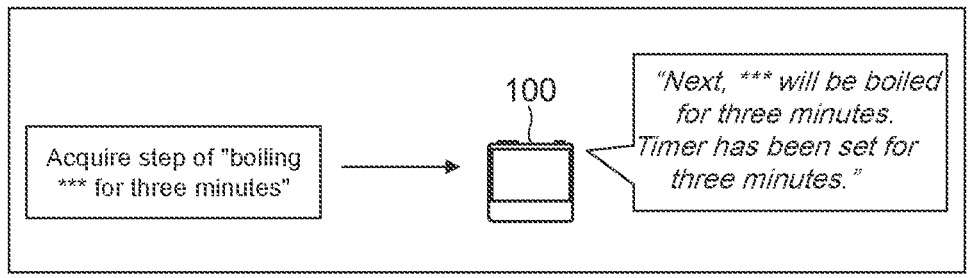
FIGS. 29A, 29B, and 29C are diagrams for describing the functions of the information processing terminal other than the reproduction of the recipes in the recipe reproduction system.
Figure 29B:
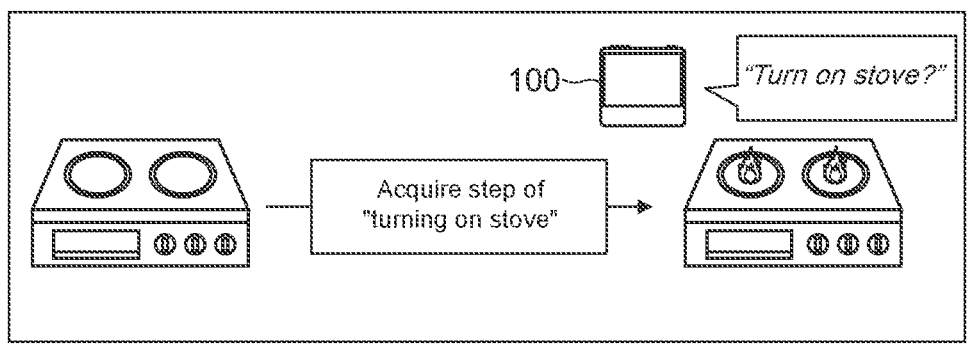
Figure 29C:
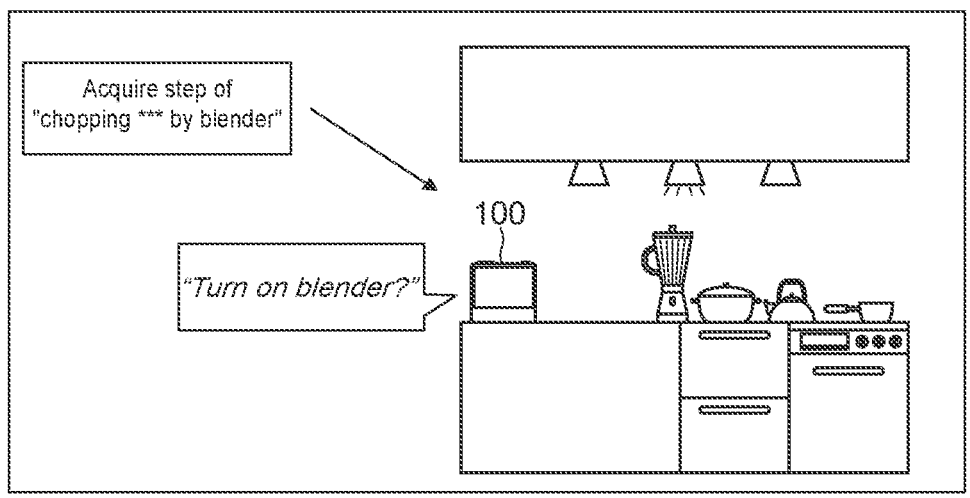

Next, the functions of the information processing terminal 100 and the information processing server 200 related to a recipe other than the reproduction of a recipe moving picture will be described. FIGS. 29A, 29B, and 29C are diagrams for describing the functions.

The information processing terminal 100 may automatically perform processing included in a cooking step without receiving instructions from the user. Thus, the user saves time and effort to provide instructions and perform cooking.

That is, when determining that an operation processable by the information processing terminal 100 is included in a step after analyzing the content of the step of a recipe, the CPU 11 and the control unit 210 may control a cooking appliance for themselves or notify the user of a message.

Specifically, when it is described in the recipe that "Boil xxx for three minutes," the CPU 11 transmits a control signal to a timer to "set the timer for three minutes" as shown in FIG. 29A. Then, the CPU 11 transmits a signal to start the set timer when recognizing that the user has turned on a stove or has uttered the word "Timer start."

Further, when it is described in the recipe that "Cook xxx over medium heat" and sensing information indicating low heat or high heat has been received from the stove, the CPU 11 transmits a signal to control the stove over medium heat together with the voice guide "Turn the stove to medium heat."

Further, when a cooking step involves a risk according to the circumstances, the CPU 11 and the control unit 210 check with the user for performing the processing of the cooking step before automatically performing the same.

For example, when it is described in a step of the recipe that "Fry xxx over medium heat" and "Chop xxx by a blender," the CPU 11 and the control unit 210 recognize the facts that "Turn on the stove over medium heat" and "Start a blender." Since the "stove" and the "blender" are set as dangerous cooking appliances, the CPU 11 and the control unit 210 check with the user for performing the processing through, for example, the voice "Turn on the stove over medium heat?" without automatically performing the processing. Thus, a danger caused by automatic processing using a dangerous cooking appliance is avoided.

Further, the CPU 11 and the control unit 210 may perform annotation processing to call a user's attention to a cooking appliance.

That is, as shown in FIG. 29B, the CPU 11 and the control unit 210 analyze the content of a step of the recipe and cause a cooking appliance associated with the step to emit light or sound. Thus, the CPU 11 is allowed to cause the user to easily understand a cooking appliance to be used in each cooking process.

On this occasion, the CPU 11 may transmit an instruction signal to the cooking appliance itself to cause the cooking appliance to emit light/sound, or may transmit an instruction signal to a device near the cooking appliance to cause the device to emit light/sound. Further, the CPU 11 may transmit an instruction signal for discriminating an "action/operation" associated with a step and instructing the user to change the color or the brightness of a place at which the user usually performs the action to an illumination device to guide the user to the place, rather than transmitting the same to a cooking appliance.

Modified Examples

The present technology is not limited to the embodiments described above and may be modified in various ways without departing from its spirit.

In the respective embodiments described above, the control unit 210 of the information processing server 200 performs the recognition, the analysis, and the functions of the DBs or the like. However, the CPU 11 of the information processing terminal 100 may perform a part or all of the recognition, the analysis, and the functions of the DBs or the like.

In the first embodiment described above, the voice input UI and the touch input UI are shown as UIs. However, the UIs are not limited to the voice input UI and the touch input UI. For example, the present technology may be applied to a UI for a mouse operation or a UI for remote control.

In the second embodiment, the recipe moving picture is shown as moving picture content. However, the moving picture content is not limited to such a recipe moving picture.
(Other)

The present technology may employ the following configurations.

(1) An information processing apparatus, including:
a controller configured to determine a user interface presented to a user among a plurality of user interfaces on the basis of user context information containing one of a user state, a user profile, and user environment information.

(2) The information processing apparatus according to (1), wherein
the plurality of user interfaces include a voice input user interface and a touch input user interface.

(3) The information processing apparatus according to (2), wherein
the controller is configured to
determine the touch input user interface as the presented user interface when determining that a distance between the user and the information processing apparatus is within a prescribed distance, and
determine the voice input user interface as the presented user interface when determining that the distance is larger than the prescribed distance.

(4) The information processing apparatus according to (2) or (3), wherein
the controller is configured to
cause one of the touch input user interface and the voice input user interface to have a first information amount when determining that a visual line of the user is directed to the information processing apparatus, and
cause one of the touch input user interface and the voice input user interface to have a second information amount smaller than the first information amount when determining that the visual line of the user is not directed to the information processing apparatus.

(5) The information processing apparatus according to any of (1) to (4), wherein,
when determining that a plurality of users exist within a prescribed region including the information processing apparatus,
the controller is configured to determine the presented user interface on the basis of a user determined to exist at a position closest to or farthest from the information processing apparatus among the plurality of users.

(6) The information processing apparatus according to any of (1) to (4), wherein,
when determining that a plurality of users exist within a prescribed region including the information processing apparatus,
the controller is configured to determine the presented user interface on the basis of a user determined to have eyes thereof turned to the information processing apparatus among the plurality of users.

(7) The information processing apparatus according to any of (1) to (6), wherein
the controller is configured to change the prescribed distance used to determine the presented user interface according to a level of sound detected around the information processing apparatus.

(8) The information processing apparatus according to any one of (2) to (7), wherein,
when the user is detected to lie down,
the controller is configured to determine the voice input user interface as the presented user interface.

(9) An information processing apparatus, including:
a controller configured to generate step switching information for controlling switching of a plurality of reproduction steps of content on the basis of one of user context information containing one of a user state, a user profile, and user environment information and sensing information collected from other devices.

(10) The information processing apparatus according to (9), wherein
the content includes moving picture content in which the reproduction steps and reproduction time are associated with each other, and
the controller is configured to control reproduction of the moving picture content on the basis of the step switching information and the reproduction time.

(11) The information processing apparatus according to (9) or (10), wherein,
when recognizing a prescribed word from voice input through a voice input or when recognizing a prescribed gesture from an image input through an imager,
the controller is configured to generate the step switching information.

(12) The information processing apparatus according to (9) or (11), wherein
the content includes recipe content in which a cooking recipe is described for each of cooking processes corresponding to the reproduction steps.

(13) The information processing apparatus according to any of (9) to (12), wherein
the controller is configured to
recognize an action of a user on the basis of the sensing information, and
generate the step switching information when determining that a cooking process corresponding to a current reproduction step is completed.

(14) The information processing apparatus according to (12) or (13), wherein
the controller is configured to
recognize a state of a foodstuff contained in the cooking recipe on the basis of the sensing information, and
generate the step switching information when determining that a cooking process corresponding to a current reproduction step is completed.

(15) The information processing apparatus according to any of (12) to (14), wherein
the controller is configured to
analyze each of the cooking processes of the recipe content, and
transmit an instruction signal for providing instructions on an output of prescribed annotation information to one of a cooking appliance of the user and a device near the cooking appliance associated with each of the cooking processes when each of the cooking processes is performed.

(16) The information processing apparatus according to any one of (12) to (15), wherein
the controller is configured to
analyze each of the cooking processes of the recipe content, and
transmit an instruction signal for providing instructions on implementation of at least a part of at least one of the cooking processes to a cooking appliance of the user used in the at least one of cooking processes.

(17) An information processing method, including:
acquiring user context information containing one of a user state, a user profile, and user environment information; and
determining a user interface presented to a user among a plurality of user interfaces on the basis of the user context information.

(18) An information processing method, including:
acquiring one of user context information containing one of a user state, a user profile, and user environment information and sensing information collected from other devices; and
generating step switching information for controlling switching of a plurality of reproduction steps of content on the basis of one of the user context information and the sensing information.

(19) A program causing an information processing apparatus to perform:
acquiring user context information containing one of a user state, a user profile, and user environment information; and
determining a user interface presented to a user among a plurality of user interfaces on the basis of the user context information.

(20) A program causing an information processing apparatus to perform:
acquiring one of user context information containing one of a user state, a user profile, and user environment information and sensing information collected from other devices; and
generating step switching information for controlling switching of a plurality of reproduction steps of content on the basis of one of the user context information and the sensing information.

(21) An information processing method of controlling a user interface of a voice assistant device, the method including:
acquiring user context information containing one of a user state, a user profile, and user environment information;
determining a presented user interface from a voice input user interface and a touch input user interface on the basis of the user context information; and
controlling an information amount of displayed content according to the determined user interface.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a controller configured to:
acquire sensing information from a plurality of external devices;
recognize a user action based on the acquired sensing information;
determine, based on the recognized user action, that a cooking process of a plurality of cooking processes is completed, wherein
the cooking process corresponds to a reproduction step of a plurality of reproduction steps of content, and
the plurality of cooking processes corresponds to a cooking recipe;
generate step switching information based on the determination that the cooking process corresponding to the reproduction step is completed, wherein the step switching information corresponds to control of switching of the plurality of reproduction steps of the content.

2. The information processing apparatus according to claim 1, wherein
the content includes picture content in which the plurality of reproduction steps is associated with reproduction time, and
the controller is further configured to control reproduction of the picture content based on the step switching information and the reproduction time.

3. The information processing apparatus according to claim 1, wherein
the controller is further configured to generate the step switching information based on recognition of one of a prescribed word from voice input or a prescribed gesture from an image input through an imager.

4. The information processing apparatus according to claim 1, wherein the controller is further configured to:
recognize a state of a foodstuff in the cooking recipe based on the sensing information; and
generate the step switching information based on a determination that the cooking process corresponding to the reproduction step is completed.

5. The information processing apparatus according to claim 1, wherein the controller is further configured to:
analyze each of the plurality of cooking processes of the recipe content; and
transmit an instruction signal to provide instructions on an output of prescribed annotation information to one of a cooking appliance of a user or a device in proximity of the cooking appliance associated with each of the plurality of cooking processes when each of the plurality of cooking processes is performed.

6. The information processing apparatus according to claim 1, wherein the controller is further configured to:
analyze each of the plurality of cooking processes of the recipe content; and
transmit an instruction signal to provide instructions on implementation of at least a part of at least one of the plurality of cooking processes to a cooking appliance of a user, wherein the cooking appliance is used in the at least one of the plurality of cooking processes.

7. An information processing method, comprising:
acquiring sensing information from a plurality of external devices; and
recognizing a user action based on the acquired sensing information;
determining, based on the recognized user action, that a cooking process of a plurality of cooking processes is completed, wherein
the cooking process corresponds to a reproduction step of a plurality of reproduction steps of content, and
the plurality of cooking processes corresponds to a cooking recipe;
generating step switching information based on the determination that the cooking process corresponding to the reproduction step is completed, wherein the step switching information corresponds to control of switching of the plurality of reproduction steps of the content.

8. A non-transitory computer-readable medium having stored thereon, computer-executable instructions which, when executed by an information processing apparatus, cause the information processing apparatus to execute operations, the operations comprising:
acquiring sensing information from a plurality of external devices; and
recognizing a user action based on the acquired sensing information;
determining, based on the recognized user action, that a cooking process of a plurality of cooking processes is completed, wherein
the cooking process corresponds to a reproduction step of a plurality of reproduction steps of content, and
the plurality of cooking processes corresponds to a cooking recipe;
generating step switching information based on the determination that the cooking process corresponding to the reproduction step is completed, wherein the step switching information corresponds to control of switching of the plurality of reproduction steps of the content.

* * * * *